US008199678B2

(12) United States Patent
Molix

(10) Patent No.: US 8,199,678 B2
(45) Date of Patent: Jun. 12, 2012

(54) GRAPHICAL ARRANGEMENT OF IT NETWORK COMPONENTS

(75) Inventor: Pascal Molix, Leinfelden (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 1357 days.

(21) Appl. No.: 11/492,197

(22) Filed: Jul. 25, 2006

(65) Prior Publication Data

US 2007/0179647 A1    Aug. 2, 2007

(30) Foreign Application Priority Data

Oct. 21, 2005   (EP) .................................... 05109861

(51) Int. Cl.
*H04L 12/28* (2006.01)
(52) U.S. Cl. ....................................................... 370/255
(58) Field of Classification Search ........................ None
See application file for complete search history.

(56) References Cited

U.S. PATENT DOCUMENTS

| 5,420,977 | A  | * | 5/1995  | Sztipanovits et al. | ......... 715/853 |
| 7,120,119 | B2 | * | 10/2006 | Frelechoux et al.   | .......... 370/238 |
| 7,412,557 | B2 | * | 8/2008  | Di Benedetto et al. | ....... 710/316 |
| 2002/0103631 | A1 |   | 8/2002  | Feldmann et al. | |
| 2003/0023751 | A1 |   | 1/2003  | Mouri et al. | |
| 2003/0145014 | A1 | * | 7/2003  | Minch | ........................... 707/100 |
| 2003/0146929 | A1 |   | 8/2003  | Baldwin et al. | |
| 2004/0017783 | A1 | * | 1/2004  | Szentesi et al. | ................ 370/256 |
| 2005/0047353 | A1 | * | 3/2005  | Hares | ............................ 370/255 |
| 2005/0069314 | A1 |   | 3/2005  | De Patre et al. | |
| 2005/0120136 | A1 | * | 6/2005  | Park et al. | ...................... 709/242 |
| 2007/0097883 | A1 | * | 5/2007  | Liu et al. | ........................ 370/254 |
| 2009/0310488 | A1 | * | 12/2009 | Mighani et al. | ................ 370/235 |

OTHER PUBLICATIONS

Oreas Optimization Research and Software: Go Visual High Performance Data Visualization Jun. 14, 2004.

* cited by examiner

*Primary Examiner* — Yemane Mesfin
*Assistant Examiner* — Rhonda Murphy

(57) ABSTRACT

A method executed by a computer is provided of graphically arranging components of an IT network into a layered representation for visualization purposes. The IT network has network components of different types, and links connecting network components. The method includes: regarding at least one network component as a source component and assigning a corresponding hierarchy level to it; assigning hierarchy levels to the other network components, based on a distance measure that represents the number of links, or the sum of weights of links, which have to be traversed to get from the network component considered to a source component, and displaying the network components in a layered representation according to the hierarchy level assigned to each component.

11 Claims, 40 Drawing Sheets

*Fig. 9*
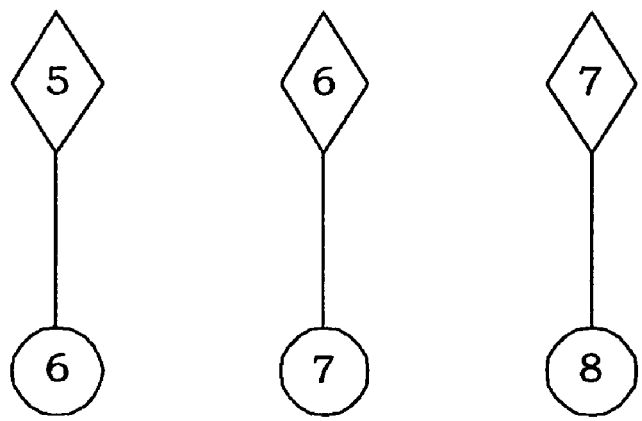
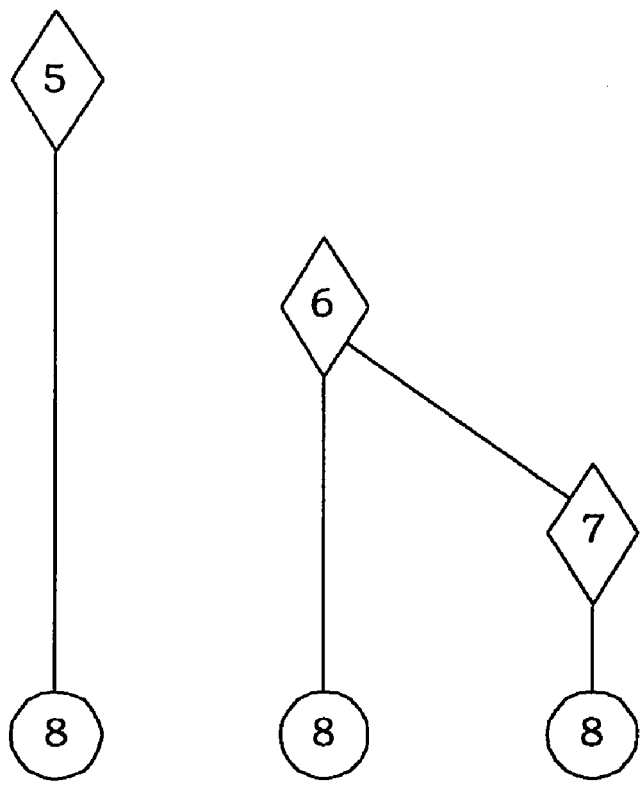

Fig. 39

| DETERMINE UNCONNECTED SUBNETWORKS OF IT INFRASTRUCTURE |
|---|
| FOR EACH SUBNETWORK |
| FOR EACH COMPONENT OF FIRST COMPONENT TYPE |
| FOR EACH COMPONENT |
| DETERMINE DISTANCES BETWEEN EACH COMPONENT AND EACH COMPONENT OF FIRST TYPE |
| END FOR |
| END FOR |
| END FOR |
| FOR EACH SUBNETWORK |
| FOR EACH COMPONENT |
| ASSIGN MINIMAL VALUE OVER ALL PASSES TO EACH COMPONENT (=HIERARCHY LEVEL) |
| END FOR |
| END FOR |
| FOR EACH COMPONENT OF LAST LAYER |
| ADAPT HIERARCHY LEVEL, IF NECESSARY |
| END FOR |

GRAPHICAL ARRANGEMENT OF IT NETWORK COMPONENTS

RELATED APPLICATIONS

The present application is based on, and claims priority from, European Patent Application Number 05109861.4, filed Oct. 21, 2005, the disclosure of which is hereby incorporated by reference herein in its entirety.

FIELD OF THE INVENTION

The present invention relates generally to displaying of information technological networks, and for example, to methods, computer systems and computer program products for graphically arranging components of an IT network for visualization purposes.

BACKGROUND OF THE INVENTION

Nowadays, as stand-alone computers have become the exception rather than the rule, since almost all information systems are interconnected to form IT networks, it may often be useful to display complex IT networks in a clearly defined manner, for instance on a video display. This desire is even becoming more urgent, since the connectivity of networks is in general on the increase due to a growing number of network components needed by current application programs.

Despite the increasing complexity of networks, an administrator of an IT network still has to keep an overview, so that he/she immediately notices communication failures between two network components and is able to intervene. Hence, the administrator requires an overview diagram in which the components and the connections between them are laid out appropriately. Not only is a clear network display important for operation, it is also important for the further development of a network. If the network components are appropriately arranged, a network planner may easily recognize whether, for instance, a switch has only few connections to other network components and therefore could be used more intensively in an upgrade of the network.

For a given network topology, there is normally a variety of reasonable ways of arranging the components since the assessment of the lucidity of a network layout normally underlies subjective perception. One way of applying objective criteria is to arrange the components in such a way that, in an ideal network layout, the number of crossings of their links is minimized, which is achieved by disentangling algorithms on graphs. Software packages providing such functionalities are, for example, offered by OREAS GmbH, Cologne, Germany under the name GoVisual® and Tom Sawyer Software, Oakland, Calif., USA under the names Tom Sawyer® Analysis, Visualization and Layout.

One type of networks liable to a prescribed topology is the storage area network (SAN) which was introduced in order to enable several servers (host devices) to share storage space, to have exclusive data access or to use data on a common storage facility. A storage area network is a high-speed, special purpose network (or sub-network) which usually includes three types of network components: host devices, fabric devices (such as bridges, switches, routers and hubs) and storage devices (such as disk arrays and tape libraries), whereby the upper side of the network is made up of host devices, the lower, opposite side is made up of storage devices and the fabric devices lie in between, when depicting the network in a standardized way.

Typically, the host devices are not interconnected and the storage devices are at most interconnected for back-up purposes, whereas the fabric devices are highly interconnected and connected with both host and storage devices. Storage area networks typically include up to 50 storage devices, and up to hundreds of host devices. Storage area networks were developed in response to three major challenges that IT managers face today: firstly, data explosion which means that applications are becoming more and more complex and therefore users need a greater amount of storage space. This also means that networks should fulfill the requirement of scalability. Secondly, the cost of storage management which means that a centralized storage management system facilitates the work of the administrators and leads, by means of increased efficiency and more effective exploitation of available resources, to a reduction of costs. Thirdly, the cost of downtime is reduced by usage of storage area networks due to redundancy in the network connectivity so that individual failing network components cannot cause a total breakdown of the SAN.

Typically, a storage area network is part of an overall network of computing resources for an enterprise and is usually clustered in close proximity to other computing resources such as mainframes, but may also extend to remote locations for backup and archival storage. Therefore, a storage device may use existing communication technology such as optical fiber technology, which offers a transmission reach of up to 10 km (or more, by means of repeaters) and copper technology providing a more limited transmission reach of 50 m. These specifications are indicated to clarify the distance between individual network components and to give an idea of the overall size of the networks. SANs support disk mirroring, backup and restoration, archival and retrieval of archived data, data migration from one storage device to another, and the sharing of data among different servers in a network.

SUMMARY OF THE INVENTION

The invention is directed to a method executed by a computer of graphically arranging components of an IT network into a layered representation for visualization purposes. The IT network includes network components of different types. The method includes: regarding at least one network component as a source component and assigning a corresponding hierarchy level to it; assigning hierarchy levels to the other network components, based on a distance measure that represents the number of links, or the sum of weights of links, which have to be traversed to get from the network component considered to a source component; displaying the network components in a layered representation according to the hierarchy level assigned to each component.

According to another aspect, a computer system is provided which is programmed to graphically arrange components of an IT network into a layered representation for visualization purposes. The IT network includes network components of different types. At least one network component is regarded as a source component, and a corresponding hierarchy level is assigned to it. Hierarchy levels are assigned to the other network components, based on a distance measure that represents the number of links, or the sum of weights of links, which have to be traversed to get from the network component considered to a source component. The network components are displayed in a layered representation according to the hierarchy level assigned to each component.

According to another aspect, a computer program product is provided which is either in the form of a machine-readable medium with program code stored on it, or in the form of a propagated signal including a representation of program code. The program code is arranged to carry out a method, when executed on a computer system, of graphically arranging components of an IT network into a layered representation for visualization purposes. The IT network includes network components of different types. Hierarchy levels are assigned to the other network components, based on a distance measure that represents the number of links, or the sum of weights of links, which have to be traversed to get from the network component considered to a source component. The network components are displayed in a layered representation according to the hierarchy level assigned to each component.

Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which:

FIG. 9 illustrates an exemplary adaptation of hierarchy levels of storage devices, according to embodiments of the invention;

FIG. 39 shows details of the hierarchy level assignment procedure, according to embodiments of the invention;

The drawings and the description of the drawings are of embodiments of the invention and not of the invention itself.

DESCRIPTION OF THE PREFERRED EMBODIMENTS

Figure 1:
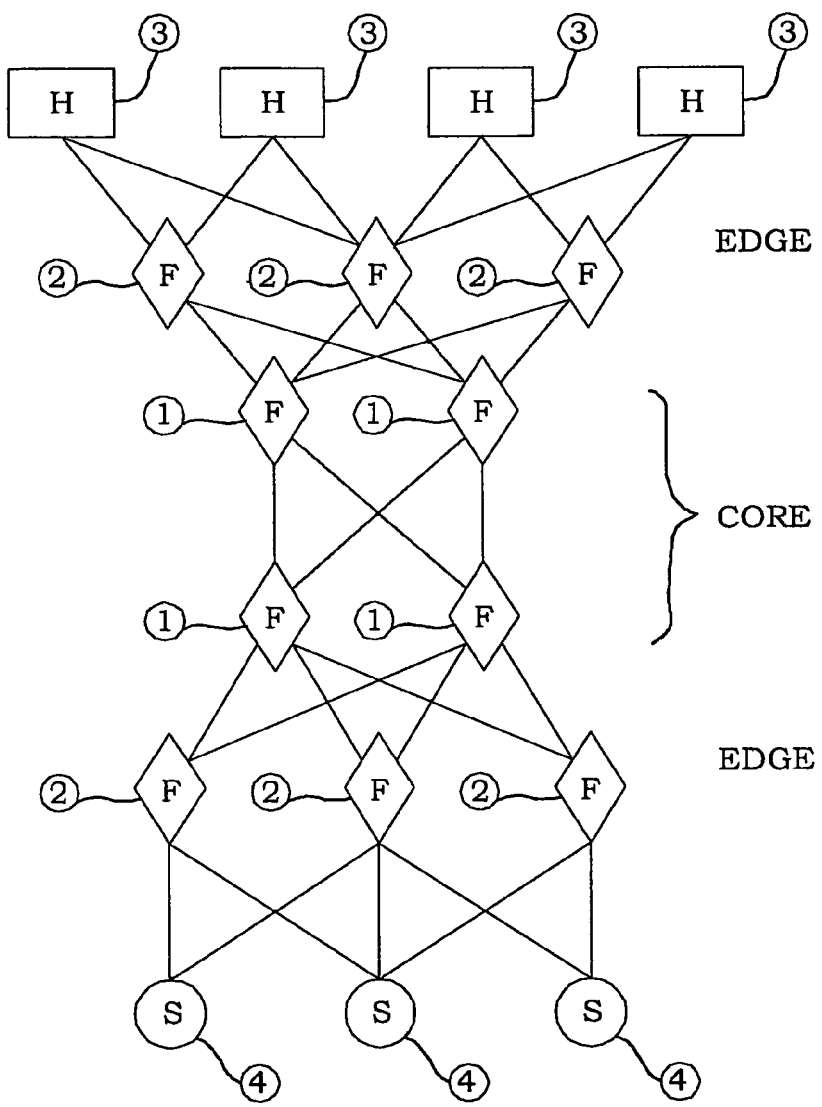
FIG. 1 is an exemplary storage area network according to a core-edge design pattern.

FIG. 1 is a storage area network (SAN) according to a core-edge design pattern. However, before proceeding further with the description of FIG. 1, a few items of the embodiments will be discussed.

In some of the embodiments, components of an IT network are graphically arranged into a layered representation for visualization purposes. The IT network includes one or more different types of components. A hierarchy level, based on a distance measure, is assigned to each component of the unconnected sub-networks. The network components are displayed in a layered representation according to the hierarchy level assigned to each component, e.g. on computer screen (video display).

The term "displaying", as used herein, is meant to include all kinds of producing an image of the network-components representation, for example by projecting by a projector, or printing it on a print media, such as paper or transparency, etc.

It should be mentioned that the term "network" as used herein refers in the case of a connected network (which means that each component is reachable from any other component by following (undirected) links) to the connected network itself, whereas in the case of several unconnected sub-networks, it refers to each individual unconnected sub-network. Incidentally, the term "unconnected sub-networks" pertains to physically independent (and therefore unconnected) sub-networks. However, since the procedure of graphically arranging network components may obtain input data from a variety of network components, it has first to determine which of them are connected to form unconnected sub-networks.

In some of the embodiments, before assigning hierarchy levels and displaying the network components, it is determined whether the IT network is completely unconnected or has unconnected sub-networks. If it is determined that there are unconnected sub-networks, assigning a hierarchy level to each component and displaying the network components is applied to the unconnected sub-networks.

In some of the embodiments, the IT network is a non-public computer network (intranet), but in other embodiments, it may be a public computer network or a telecommunications network. The term "IT network" or "network" are synonymously used herein. The networks that the embodiments of the invention have been primarily conceived for are storage area networks, which are usually connected to a LAN (local area network) or a WAN (wide area network), like the Internet through the servers. Storage area networks (SAN) are high-speed sub-networks of shared storage devices, which are interlaced into an overall network of computing resources. A storage device is a machine that includes one or several mass-storage devices like disks or tapes for storing data. A SAN's architecture works in a way that makes all storage devices available to all servers on a LAN or WAN. As more storage devices are added to a SAN, they will also be accessible from any server in the larger network. In this case, the server merely acts as a pathway between the end user and the stored data. Since, thanks to storage area networks, stored data does not reside directly on any of a network's servers, server power may be utilized for business applications, and network capacity is released to the end user.

In the literature, the term "network" is used with different meanings: in a generic meaning, the term "network" refers to any system of interconnected computers. In a more specific meaning, the term "network" refers, for example, to a collection of computers interconnected by a single technology (see, for example, A. S. Tanenbaum: "Computer Networks", fourth edition, 2003, Pearson Education International, pp. 1-3). According to another specific meaning, "network" refers to a collection of hosts which have a common IP network identifier (netid) in their IP addresses (see, for example, Stevens, pp. 7-9, and Tanenbaum, "Computer Networks", pp. 436-438). A "network" in the first mentioned, generic meaning is then considered as a "network of networks", and is consequently often referred to as an "internetwork" (the name "Internet" is derived from that; it refers to the global public internetwork in which machines run the TCP/IP protocol suite, have an IP address and can send IP packets to all other machines on the Internet; see Tanenbaum, "Computer Networks", page 56). In the present description, however, a different terminology is used: the terms "IT network" and "network" are herein used in the first-mentioned generic meaning according to which they refer to a collection of interconnect devices; this collection may be an "internetwork" of several "networks" in one of the above-mentioned specific meanings. A typical IT network is a non-public LAN, but it may also include parts of a public network, such as the Internet, if the networked computers of interest are connected via the Internet.

In some of the embodiments, the component types of the IT networks are prioritized in that components of the highest priority are supposed to form a first layer, whereas the components with the lowest priority are supposed to form a last layer. The components of all other layers form an intermediate layer which may be further divided into sub-layers.

It should be mentioned that the term "layer" is frequently used in the context of IT networks, for example with reference to the OSI Communication Model, in which layers refer to a view onto a network in which specific actions are performed according to a protocol. The term "layer" here, however, merely refers to the graphical meaning of the word which means that the network components are graphically arranged by grouping several network components into one imaginary line.

The terms "component" and "network component", refer to the devices the network is composed of, but not to the links between the devices. Network component is a generic term for host devices, storage devices, hubs, switches, routers and bridges.

The term "type of component" refers to a generalization of network component devices. Hubs, switches, routers and bridges may be summarized by the term "interconnect devices" or "fabric devices".

The term "distance measure" in an IT network expresses that distances between network components may be measured according to a metrics. The metrics appropriate for measuring are determined by the user in advance.

In some of the embodiments, the metrics used for determining the distance between two network components is the number of links which have to be traversed to get from one network component to another. This metrics is useful in terms of displaying an IT network in an appropriate way since it is a discrete metrics and therefore yields an integer number of hierarchy levels.

The term "hierarchy" refers to networks in which one or more network components are regarded as source components and all the other components are assigned distance values according to their distance from one of the source components. If the networks are regarded as undirected graphs with the devices as vertices and the links as edges, the graphs corresponding to the networks are allowed to have cycles. A hierarchy is nevertheless possible, as some network components are regarded as source components forming the summit of the hierarchy which is also referred to as "first layer" in this context.

In some of the embodiments, there are at least two different device types, the terms "first layer" and "last layer" are used in the context of prioritization of network component types, which means that in the graphical arrangement of network components, the "first layer" includes those network components with the highest priority and is therefore arranged at the top of the representation, whereas the "last layer" is the one with the lowest priority and is arranged at the bottom of the representation. All other component types form an intermediate layers, which can be further divided into sub-layers, whereas the first and last layer are not further divided into sub-layers.

In other embodiments, the arrangement of network components is not made horizontally from top to bottom, but vertically from left to right. Then the layer with the highest priority is the left layer and the layer with the lowest priority is the right layer. The devices belonging to the first layer are also referred to as source components, from which the distances to all the other components are calculated.

In some of the embodiments, there are networks which are made up of different network types. The procedure of graphically arranging network components described hereinafter is primarily designed for storage area networks which feature three network component types, whereas in other embodiments the procedure is also applied to networks with an arbitrary number of component types. In order to arrange the components of the network in a graphically clear way, which means a layered representation in this case, one type of component has to be determined as first layer by convention. In the case of storage area networks, this layer is made up of host devices which are depicted as the top layer according to the standardized representation of storage area networks.

In some of the embodiments, before arranging the components into a layered representation, unconnected sub-networks are determined. To this end, all network components which are reachable by following a number of links from any device of the first layer are assigned the same label. The labeling is started with devices of the first device type. Then, another arbitrary device of the first device type which has not been reached by the previous device is assigned another label. If there are not any devices of the first device type left, then a component of the second device type is assigned the other label, and all the devices reachable from this device are assigned the same label. The procedure continues until each component is assigned a label indicating the unconnected sub-networks it belongs to. After having determined unconnected sub-networks, each unconnected sub-network is processed independently.

In some of the embodiments the components of an unconnected sub-network are connected with links between the components and are assigned numerical values, called link weights. A path between two components is assigned the sum of link weights belonging to the path, called path weight. The minimal distance between two components is the minimal path weight of all paths between the two components.

In some of the embodiments, the hierarchy level of a component indicates the minimal distance from the component to any of the components of the first layer.

According to the prioritization mentioned above, the first device type of the first unconnected sub-network is considered as source type. In a first pass, an arbitrary device of this type is considered to be the source component and the minimal distance from each individual component to the source component is determined. This calculation of minimal distances is done according to a procedure proposed by E. Dijkstra, a Dutch computer scientist.

In other embodiments, the calculation of minimal distances is performed by means of a breadth-first search. After minimal distances from the first source component to all the other components have been determined, any other device of the source type is considered to be the source component in the next pass, and all the other components of the source type are regarded as source components in the following passes of the procedure. Thus, there are as many passes as there are devices of the source type in the unconnected sub-network. After all passes have been performed, each component has been assigned as many minimal distance values as there are passes, because each pass of the procedure has assigned one minimal distance value to each component. The hierarchy level finally assigned to a component is the minimal value over all minimal distance values assigned to the component.

In some of the embodiments, when looking at the devices belonging to the type of network components which comes last in the prioritized list of components, it happens that not all of the network components belonging to that type have been assigned the same hierarchy level. In this case, the hierarchy levels assigned to all devices are equalized in such a way that all network components of the last type in the prioritized list are assigned the same hierarchy level which is the maximum hierarchy level assigned to the devices of the last type.

All the other unconnected sub-networks are processed in the same way as described above. At this stage, each network component features a uniquely defined hierarchy level indicating the minimal number of links which are necessary to reach any component of the first layer from said network component. It should be mentioned that, as the hierarchy levels of the components of the last layer are adapted if the values assigned to the components of the last layer are not the same, the hierarchy levels of the last layer do not necessarily indicate the minimal number of links necessary to reach any component of the first layer, but may indicate a higher value.

In some of the embodiments, the hierarchy level is used to display the network in a graphically appealing way so that all network components having the same hierarchy level are arranged on the same imaginary horizontal line. Not only are the calculated hierarchy levels useful for directly displaying the network, but they can also be used as additional information for automated layout algorithms (like Tom Sawyer or OREAS) which do not know the characteristics of a storage area network and may improve their output results by means of these additional information.

Some of the embodiments of the computer program product with program code for performing the described methods include any machine-readable medium that is capable of storing or encoding the program code. The term "machine-readable medium" shall accordingly be taken to include, for example, solid state memories and, removable and non-removable, optical and magnetic storage media. In other embodiments, the computer program product is in the form of a propagated signal comprising a representation of the program code, which is increasingly becoming the usual way to distribute software. The signal is, for example, carried on an electromagnetic wave, e.g. transmitted over a copper cable or through the air, or a light wave transmitted through an optical fiber. The program code may be machine code or another code which can be converted into machine code, such as source code in a multi-purpose programming language, e.g. C, C++, Java, C#, etc. The embodiments of a computer system may be commercially available general-purpose computers programmed with the program code.

Returning now to FIG. 1, which shows a storage area network (SAN) according to a core-edge design pattern which is typically applied if there are more host devices than storage devices in the SAN. The SAN is depicted in the usual representation of storage network areas, which means that host devices are arranged at the top and storage devices are arranged at the bottom of the depiction. SANs are flexible and scalable which means that servers, storage devices, and switches can be added as an organization's needs grow. This "pay-as-you-grow" technology makes it possible to keep the initial SAN design simple, and then to scale it when business needs demand. The core-edge design has proven to be a flexible and effective solution for meeting the requirements of availability, scalability, and performance. Core-edge designs work with a variety of applications and feature a high availability, provided by redundant paths between fabric elements. The core-edge design shown here has four core switches 1 in the center of the fabric devices, which interconnect six "edge" switches 2. Hosts 3 and storage devices 4 connect to the free ports on the edge switches 2. The illustrated SAN is scalable by adding further devices, such as switches and hosts to the SAN. One technique is to replace the lower port-count switches in the core with higher port-count switches, and re-deploy the replaced switches as edge switches. The host devices of the SAN in FIG. 1, and in all following figures, are shown as rectangles, the fabric devices are indicated as rhombs and the storage devices are indicated as circles.

Figure 2A:
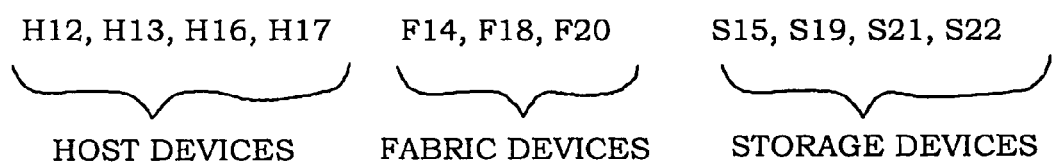
FIG. 2 shows a decomposition of another exemplary storage area network into its unconnected sub-networks, according to embodiments of the invention.

The following figures illustrate a procedure of determining and assigning a hierarchy level to each component of a SAN according to embodiments of the invention:

FIG. 2a shows an ordered list of network components used as an input to determine the connected network components. The network components in the list are prioritized in such a way that the list starts with host devices (H), followed by fabric devices (F) which are followed, in turn, by storage devices (S). Each device is assigned an index referring to the device number according to FIG. 2b.

Figure 2B:
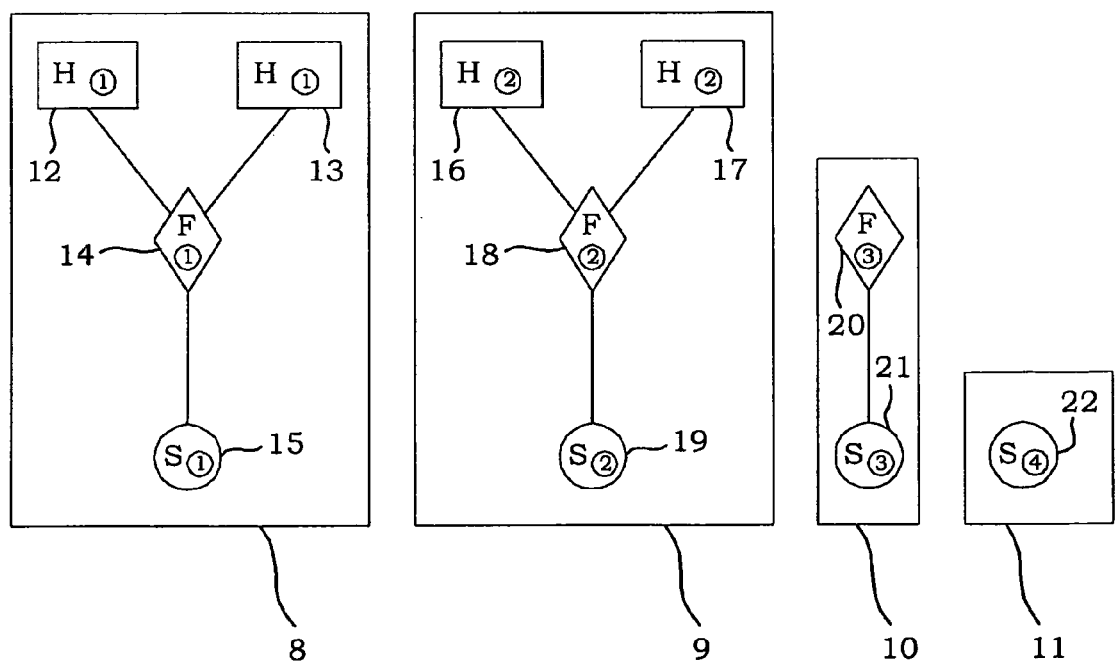

FIG. 2b illustrates the network components listed in FIG. 2a and the links between them. The unconnected components are determined. It is indicated that the SAN includes four unconnected sub-networks 8, 9, 10, 11, which are not known a priori and have to be determined first.

To this end, the procedure is provided with an ordered list of network components depicted in FIG. 2a and starts with a first host device H12 which is labeled as "1" (in a circle). At that stage, as shown in FIG. 2b, host device 12, host device 13, fabric device 14 and storage device 15 are labeled with "1" since they are reachable from host device 12. Then, the procedure runs through all the devices reachable from that first host device 12 and also labels them as "1". The procedure runs again from devices labeled "1" in the previous run. This is repeated until, in a new run, no device is newly labeled as "1".

After that, the procedure starts with the next host device (host device 16) in the ordered list which has not yet been labeled, and labels it as "2". Again, it runs through all the network components reachable from the second host device 16 and assigns them the same label. The runs are repeated in the same way as in the "1"-labeling procedure just described, until no new device is labeled as "2". Then, the procedure attempts to mark the next host devices with label "3", but since there are no host devices left in the ordered list, the procedure goes over to the next network type according to a priority rule (1. host devices, 2. fabric devices, 3. storage devices) and marks fabric device 20 next in the list with label "3" and labels all components reachable from that fabric device 20 with label "3". The procedure again attempts to mark further fabric devices with label "4", but since there are not any devices left, the procedure marks the remaining storage device 22 with "4".

Figure 3:
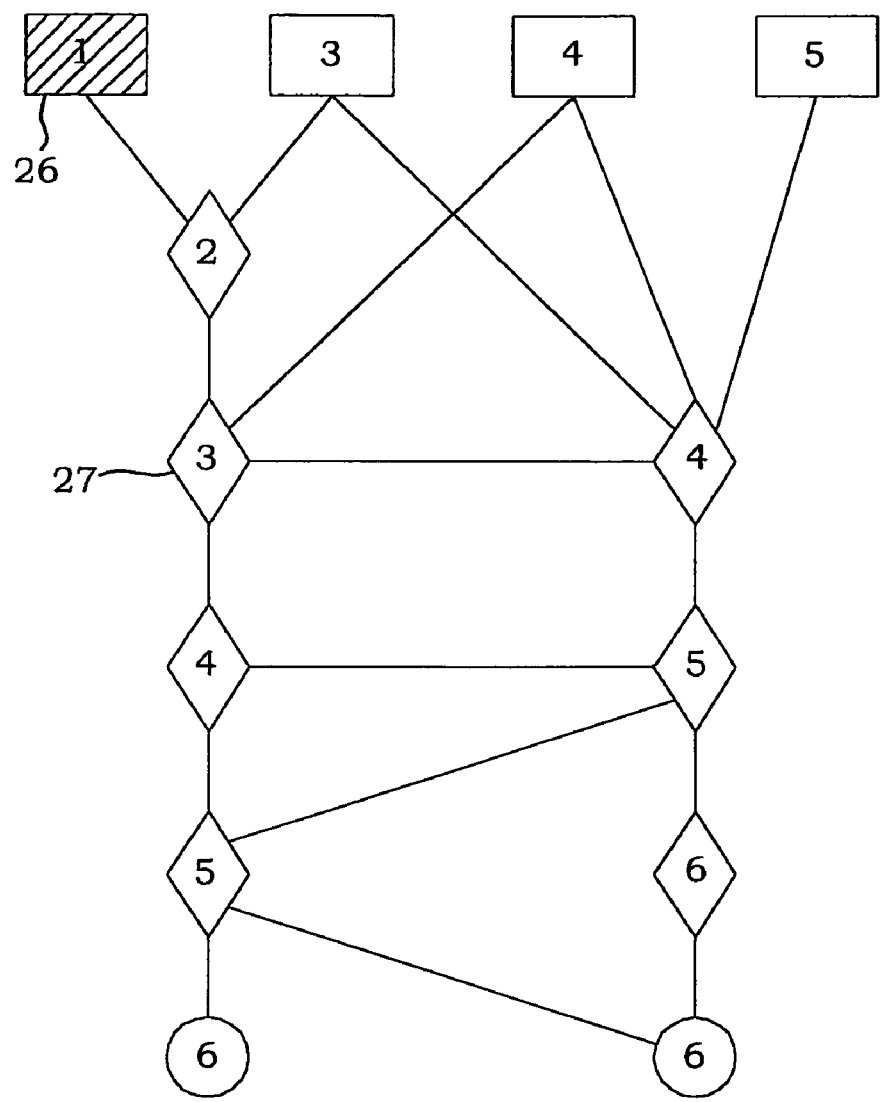
FIG. 3 shows minimal distances from each component of the storage area network to a first host device (first pass), according to embodiments of the invention.

FIG. 3 shows a storage area network, in which the individual components are assigned values. One of the components is regarded as a source component 26 (hatched box), based on its component type, here a host component, which is the leftmost host device of the SAN in this illustration. The source component is assigned value "1". The other components are assigned values associated with the minimal distance from each component to the source component 26, The values assigned to each of the other components indicate the number of links necessary to reach the source component 26 from the corresponding component plus 1. For example, component 27 is assigned value "3", since two links need to be traversed to reach the source 26 from the fabric 27.

Figure 4:
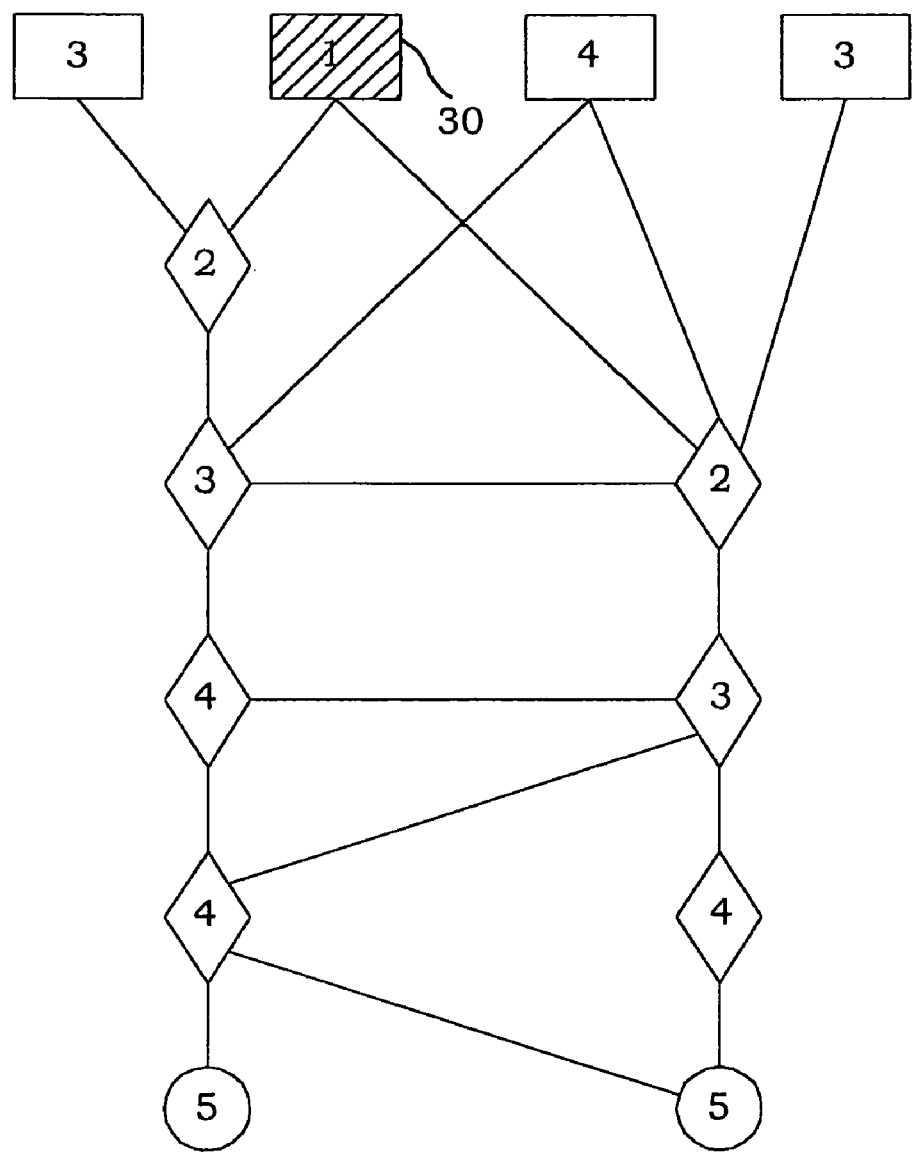
FIG. 4 indicates minimal distances from each component of the storage area network to a second host device (second pass), according to embodiments of the invention.
Figure 5:
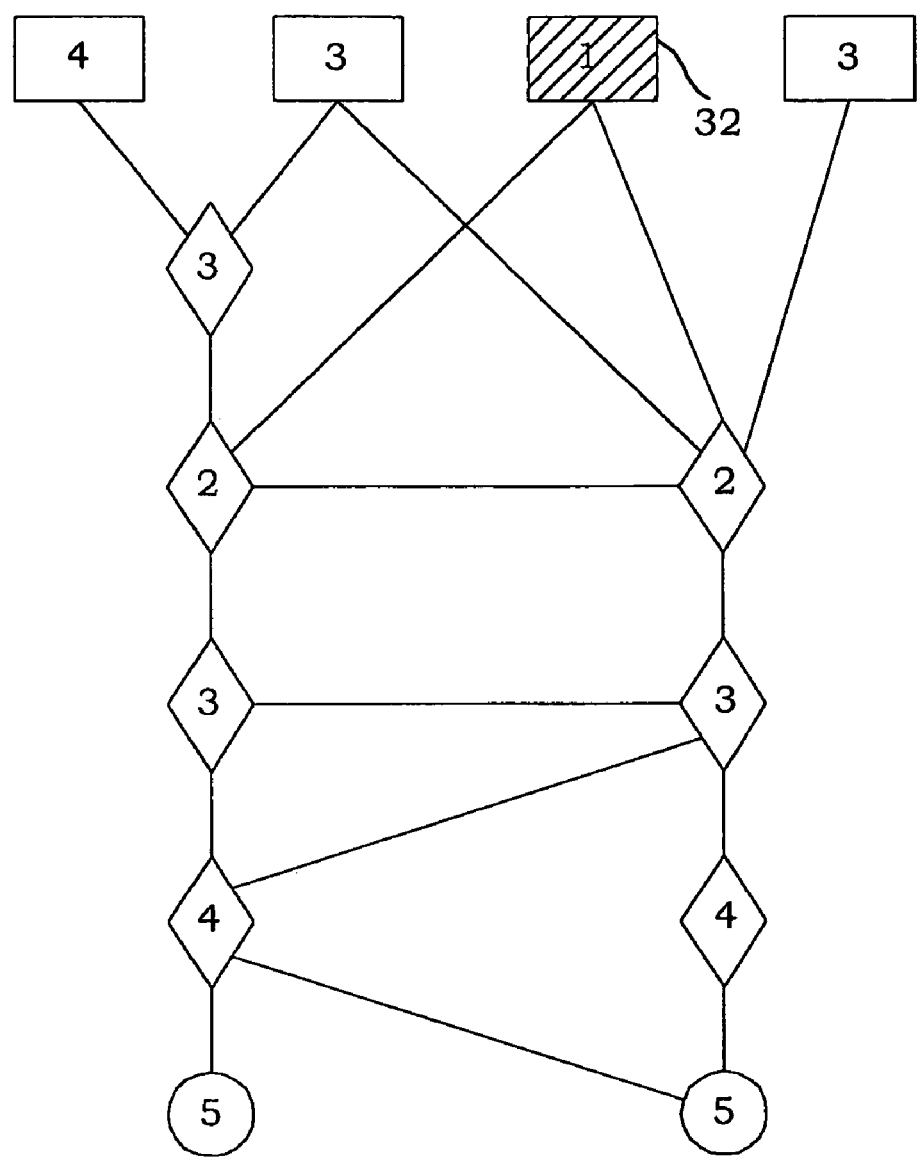
FIG. 5 indicates minimal distances from each component of the storage area network to a third host device (third pass), according to embodiments of the invention.
Figure 6:
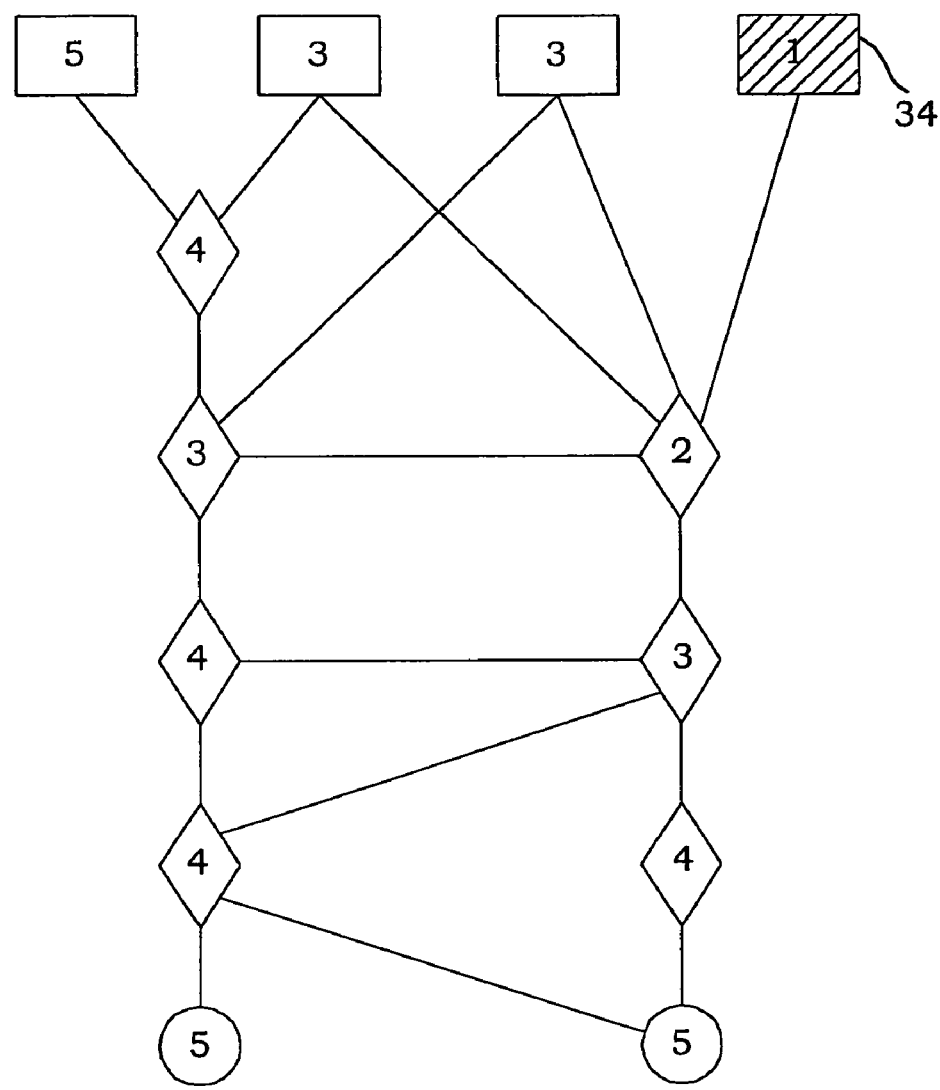
FIG. 6 shows minimal distances from each component of the storage area network to a fourth host device (fourth pass), according to embodiments of the invention.

FIGS. 4 to 6 show the storage area network of FIG. 3, whereby in each figure another host device is selected as the source component:

In FIG. 4, host device 30 is considered to be the source component 30 (hatched box), and assigned value "1". Each other individual component is assigned a value, indicating the minimal number of links necessary to reach the source component 30 plus 1.

In FIG. 5, host device 32 is considered to be the source component 32 (hatched box), and assigned value "1". The value assigned to each other individual component represents the minimal number of links necessary to reach the source component 32 plus 1.

In FIG. 6, host device 34 is considered to be the source component 34 (hatched box), and assigned value "1". The value assigned to each other individual component represents the minimal number of links necessary to reach the source component 34 plus 1.

Figure 7:
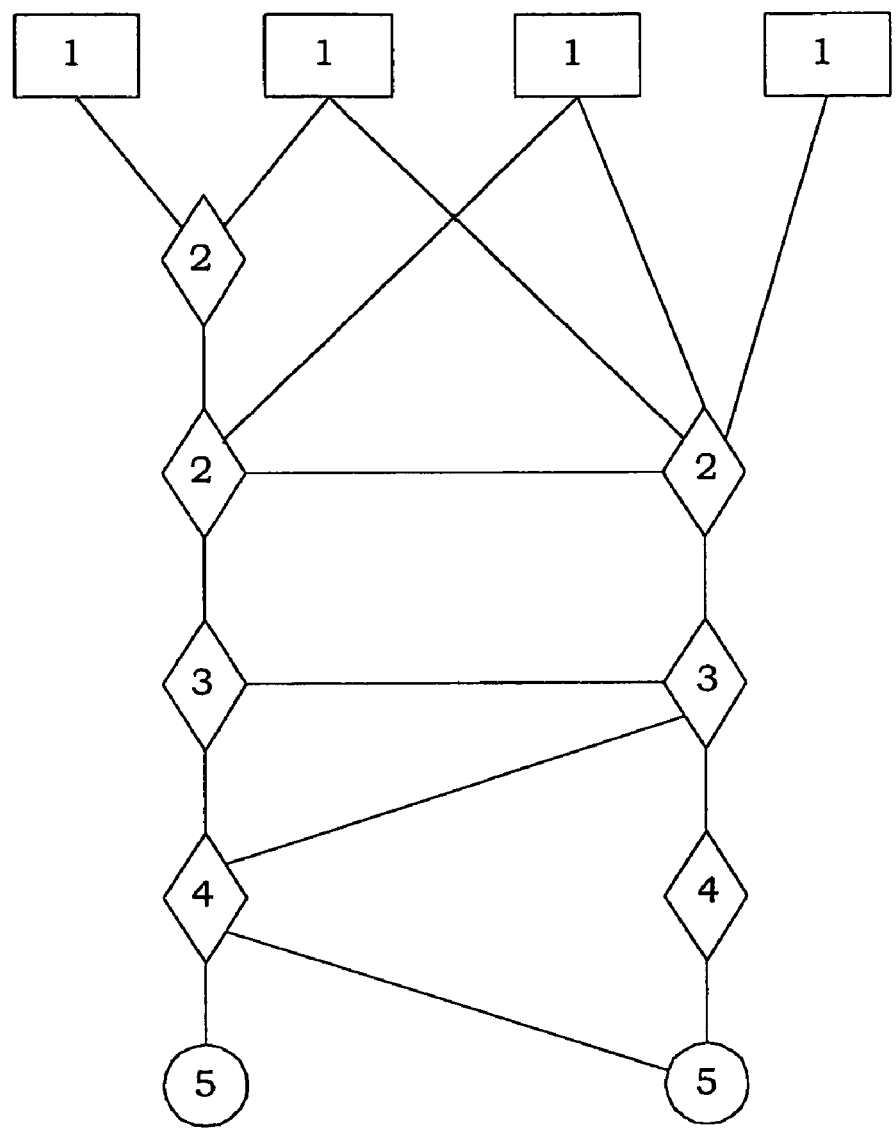
FIG. 7 indicates hierarchy levels of all network components (minimal distances over all passes), according to embodiments of the invention.

FIG. 7 illustrates the minimal distances from each component to any of the host devices. This means, that for each component the minimal value of the FIGS. 3 to 6 is taken as a hierarchy level of the corresponding component.

Figure 8:
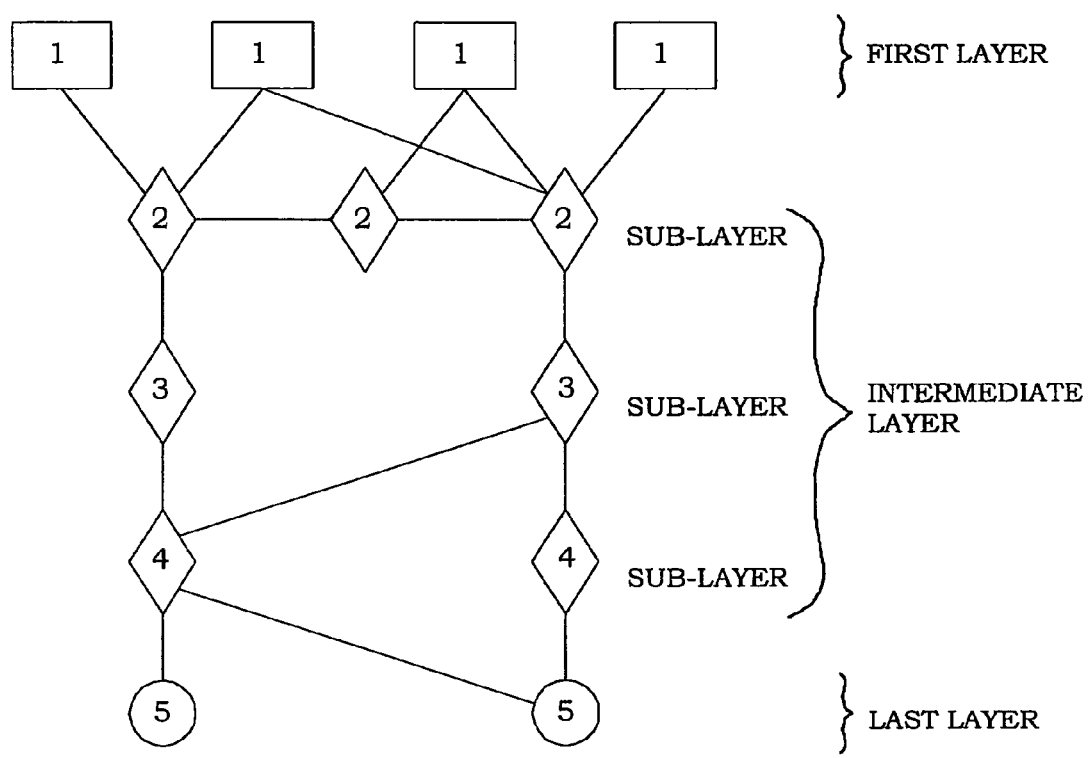
FIG. 8 illustrates a graphical arrangement of the network components according to calculated hierarchy levels, according to embodiments of the invention.

FIG. 8 shows the output of the graphical arrangement procedure. The network components are arranged according to the hierarchy levels of FIG. 7. All components having the same hierarchy level are arranged on the same horizontal line. The host devices form the first layer, the storage devices form the last layer and the fabric devices form an intermediate layer which is further divided into three sub-layers. Both storage devices are assigned the value "5" so that they are arranged on the same horizontal line. However, it may also happen that storage devices are assigned different values which would lead to the storage devices being arranged on different horizontal lines. Since this depiction would not correspond to a usual representation, all storage devices should be arranged on the same horizontal line.

Therefore, FIG. 9 shows an adaptation of hierarchy levels if the shortest paths from the storage devices to the host devices were different which would imply that the storage devices were arranged on different levels in the output layout. Therefore, the maximum of the calculated shortest paths of the storage devices is used as a hierarchy level for all storage devices. In the example, the calculation of shortest paths yields the values "6", "7" and "8" for the corresponding storage devices. Thus, the hierarchy level assigned to each storage device is "8", so that all storage devices are arranged on a common bottom line as prescribed by the standardized layout of storage area networks.

FIGS. 10 to 23 show a procedure (proposed by E. Dijkstra (Dutch computer scientist (1930-2002); see, for example, Cormen T. H., Leiserson C. E., Rivest, R.L.: "Introduction to Algorithms", MIT Press, pp. 527-531) which calculates the shortest paths from a source component 26 and which is performed to assign a hierarchy level to each component. Thus, the FIGS. 10 to 23 explain in detail how the distance values of FIG. 3 are calculated.

Figure 10:
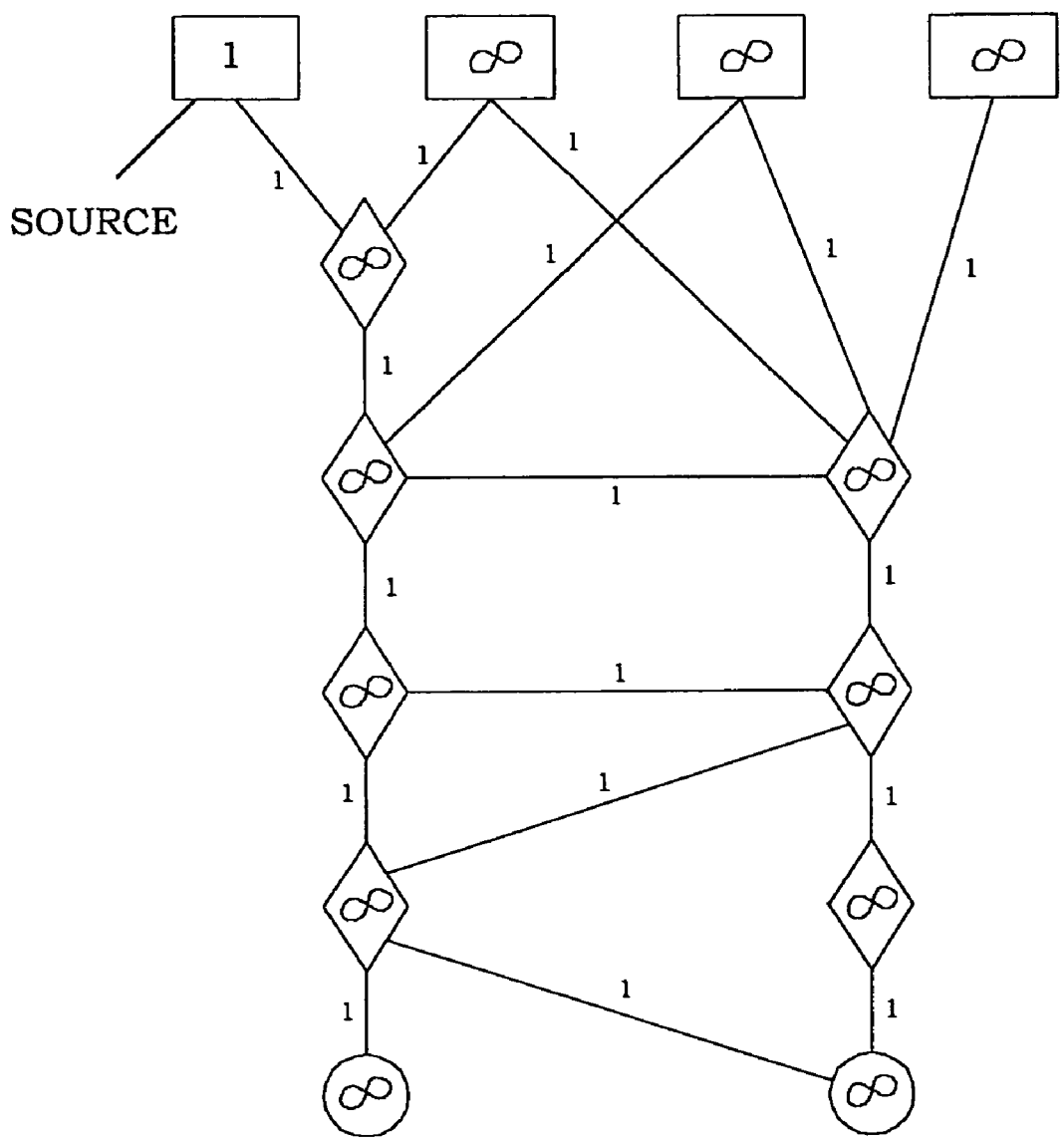
FIGS. 10 to 23 illustrate an exemplary calculation of minimal distances according to a single-source-shortest-paths procedure by Dijkstra with the first host device as a source component, according to embodiments of the invention.

FIG. 10 shows the initial state of a single-source-shortest-paths procedure. The link weights between the individual components (the lengths of the links) are all set to "1" and the source component is assigned the value "1", whereas the components are assigned the value "infinity" since they have not yet been explored.

Figure 11:
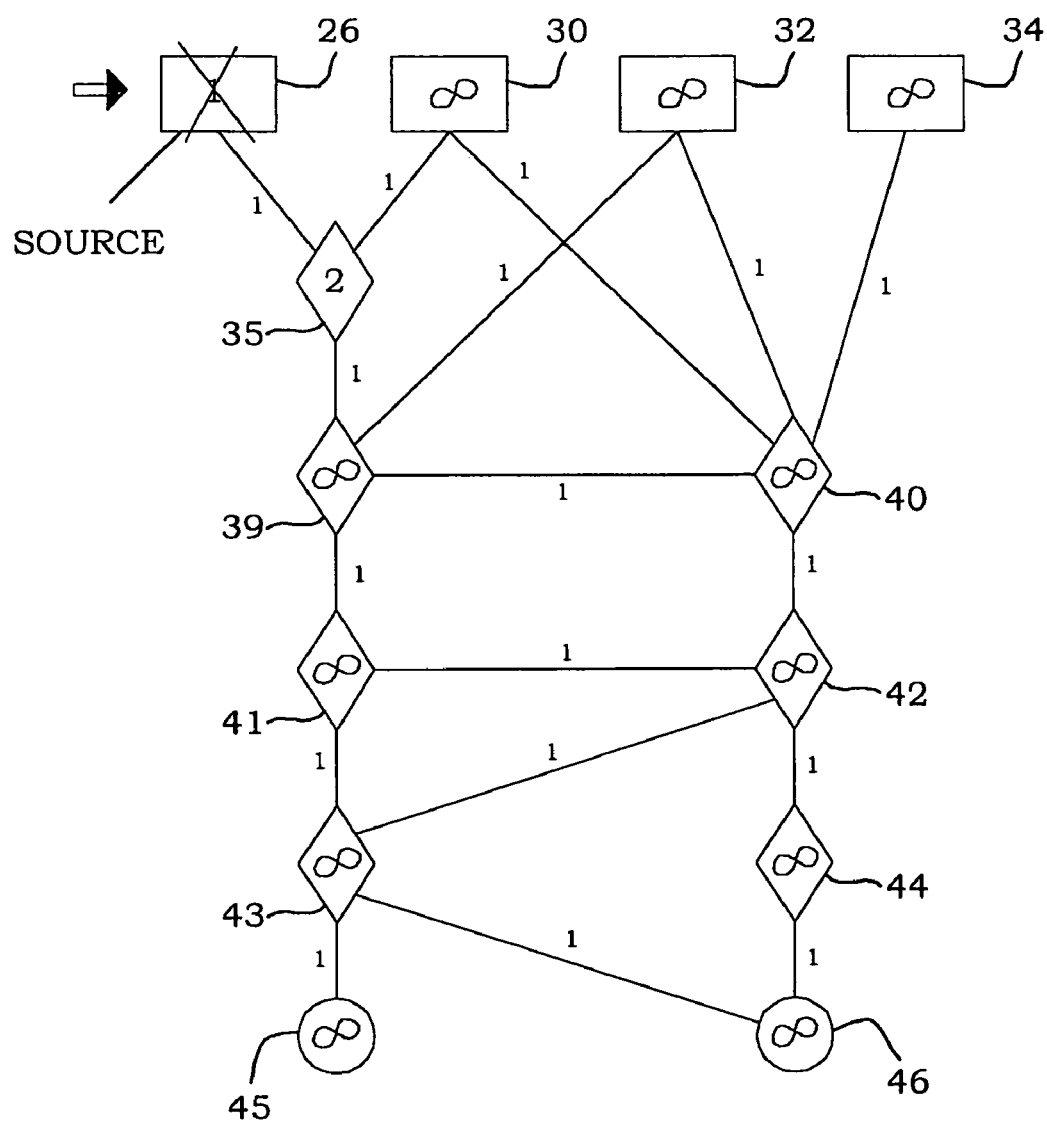

FIG. 11 shows expansion of the component with the minimal distance value. In this case, the source component 26 is chosen for expansion since it has the minimal value among all components, namely "1", in comparison to all other components which have "infinity" as distance value at this stage of the procedure. Expansion means that all the components reachable from the original component via one single link are assigned the distance value of the original component value plus the weight of the link connecting the original component with the component just being explored by the expansion. Component 35 is therefore assigned value "2". The original component 26 is crossed out since it is not used any more in the further procedure.

Figure 12:
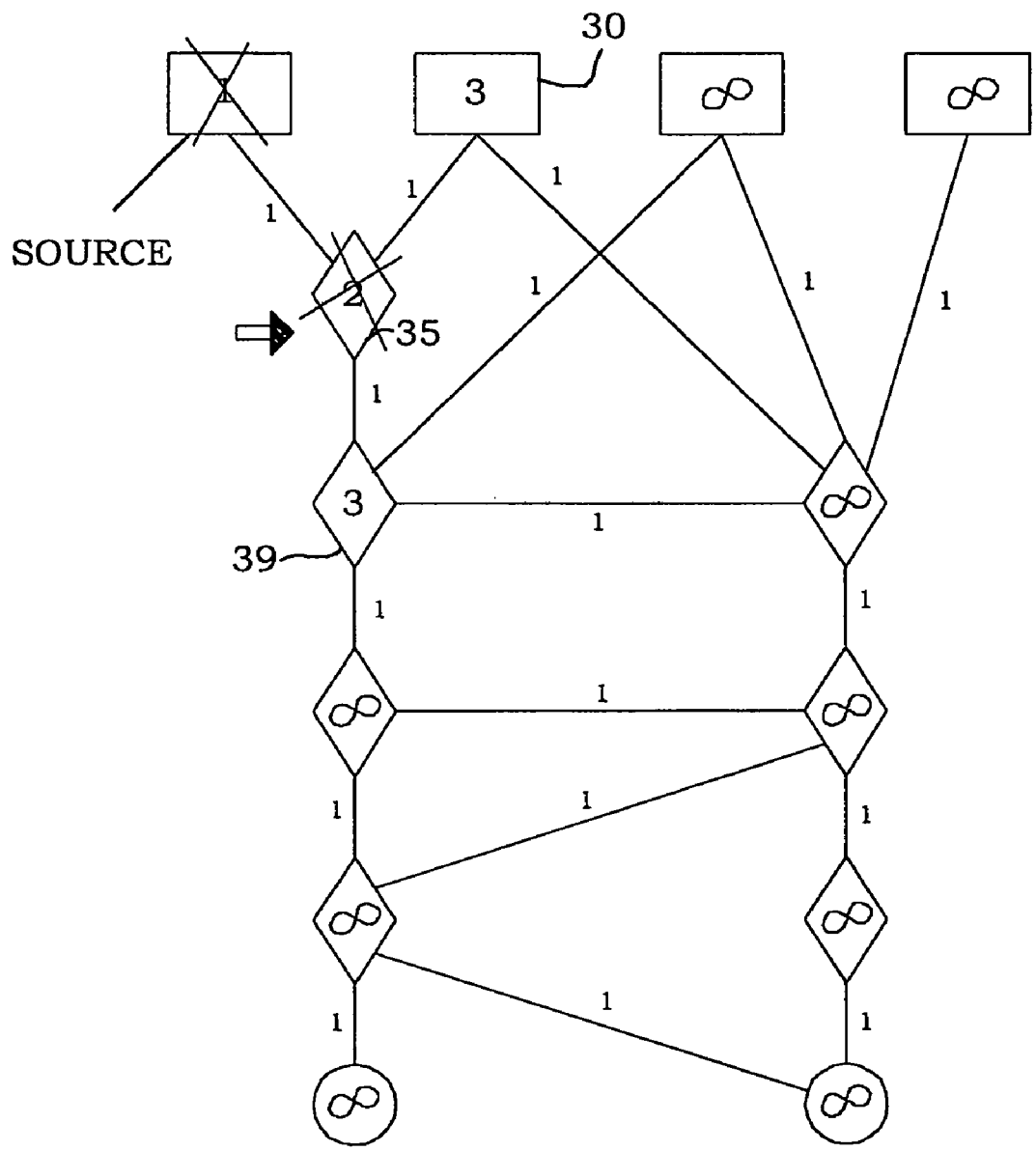

In FIG. 12 the procedure continues expanding the component with the minimal value among all components which have not yet been crossed out. An arrow points to the component to be expanded, which is component 35, and the neighboring components 30, 39 (i.e. components reachable from the original component via one single link) are assigned a distance value made up of the distance value of the original component plus the link weight connecting the two components. The original component 35 is crossed out.

Figure 13:
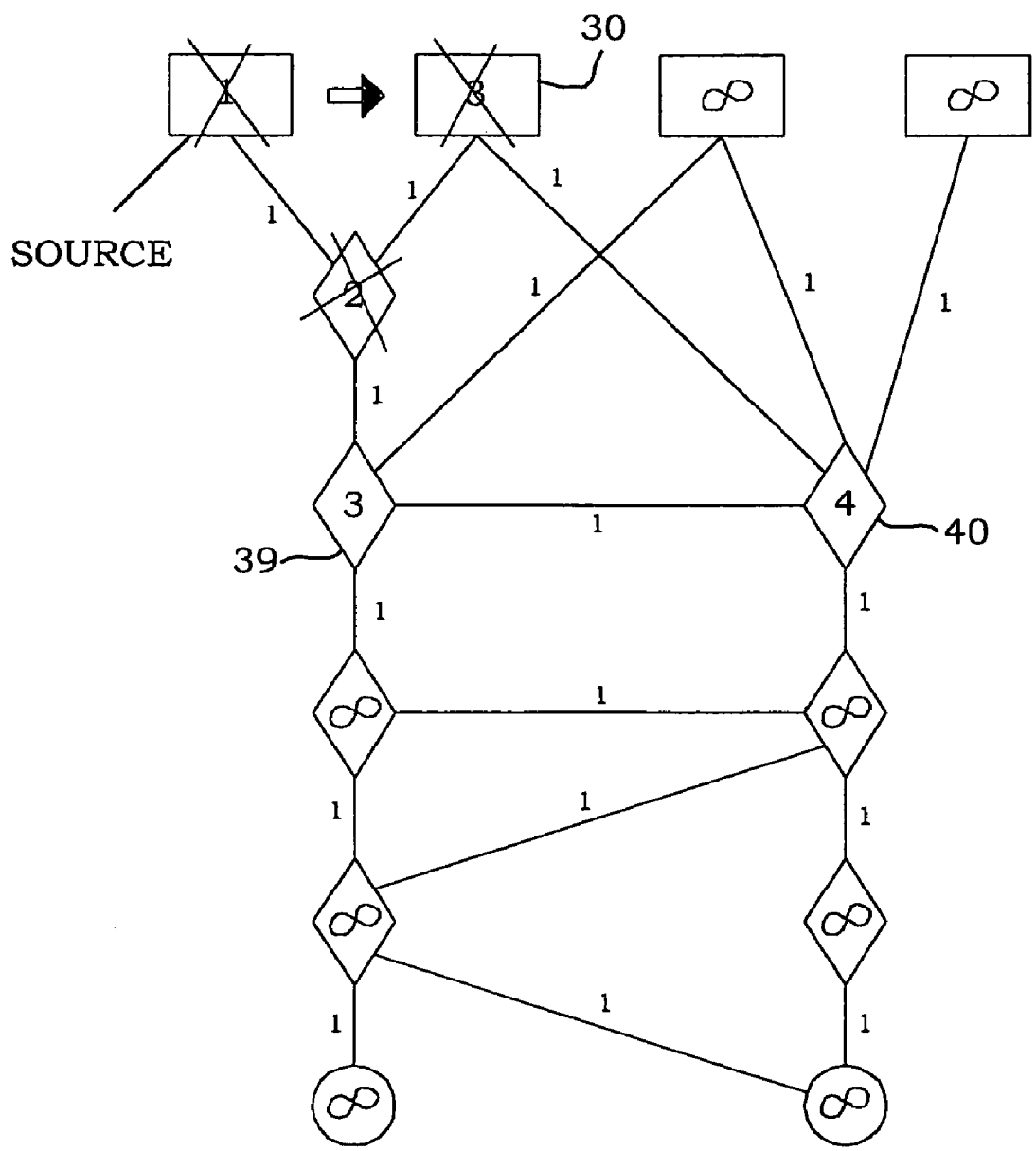
Figure 14:
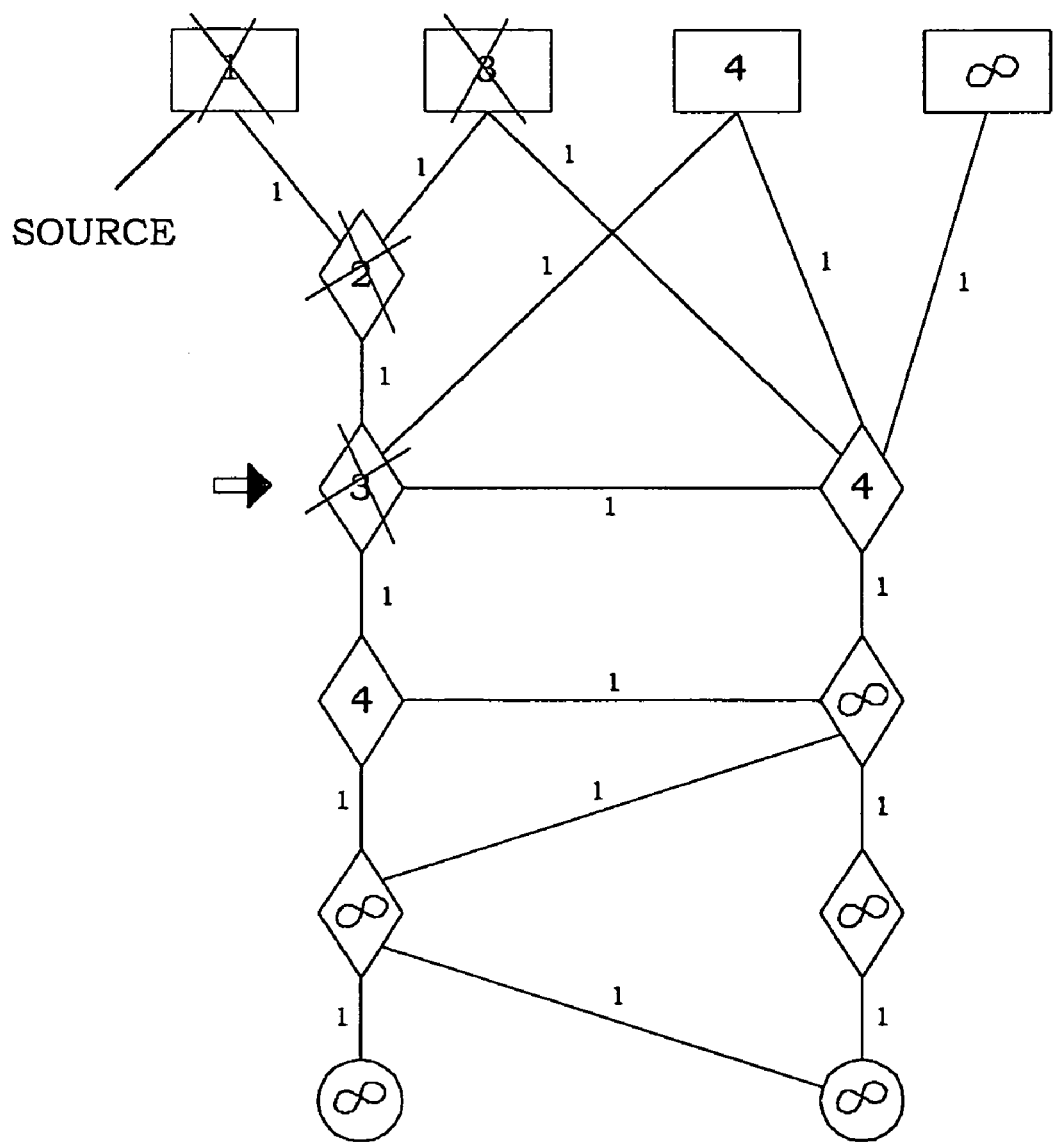
Figure 15:
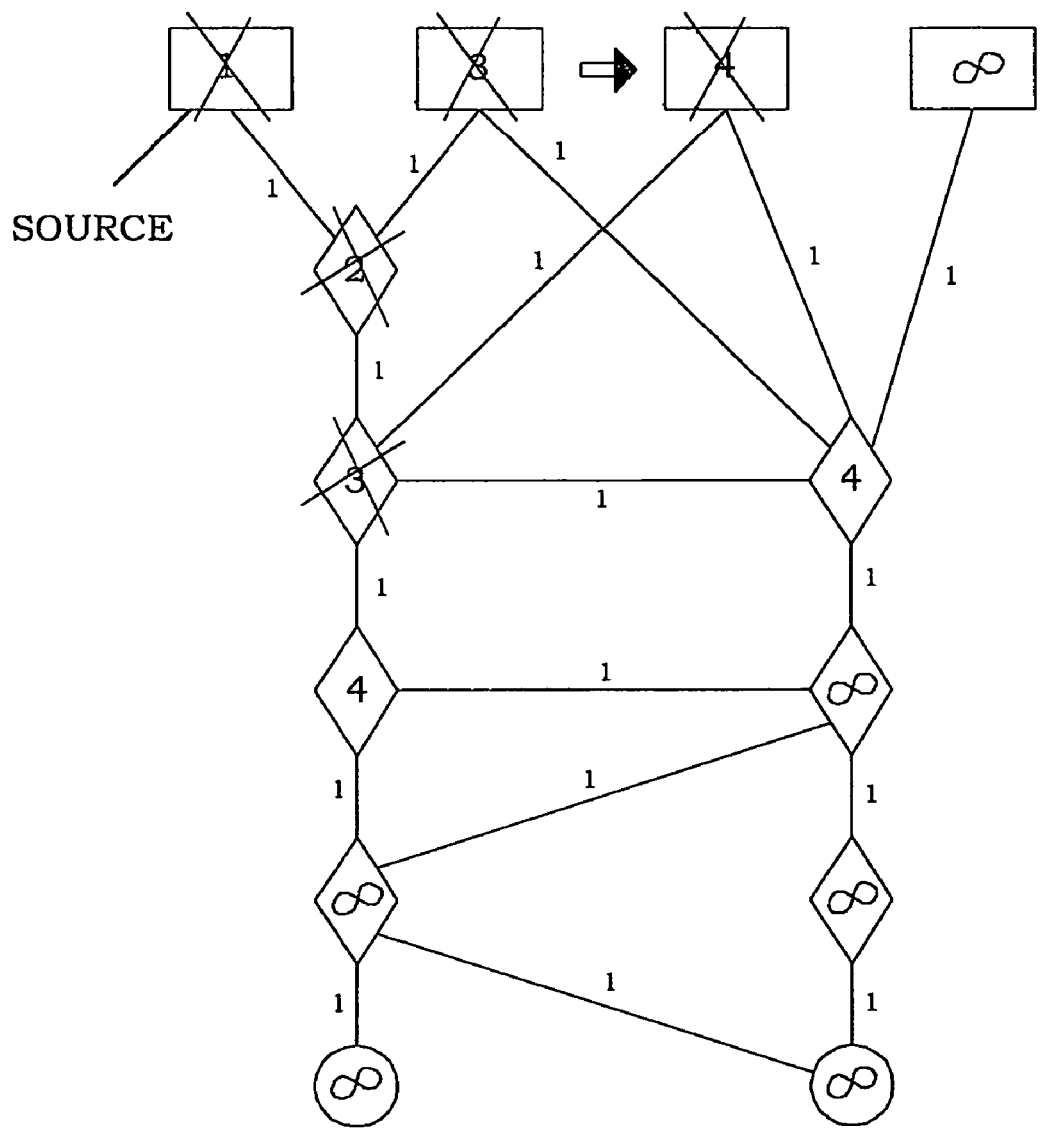
Figure 16:
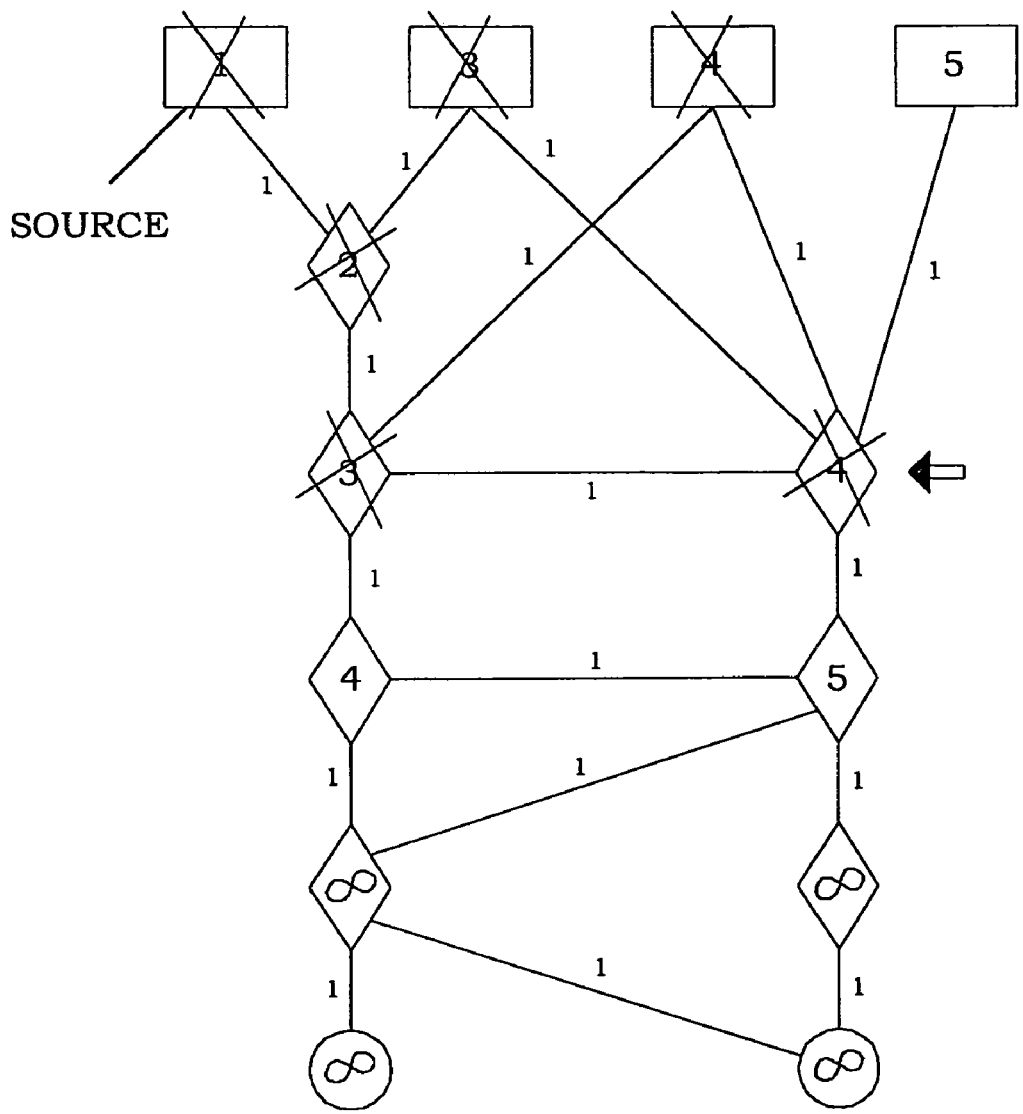
Figure 17:
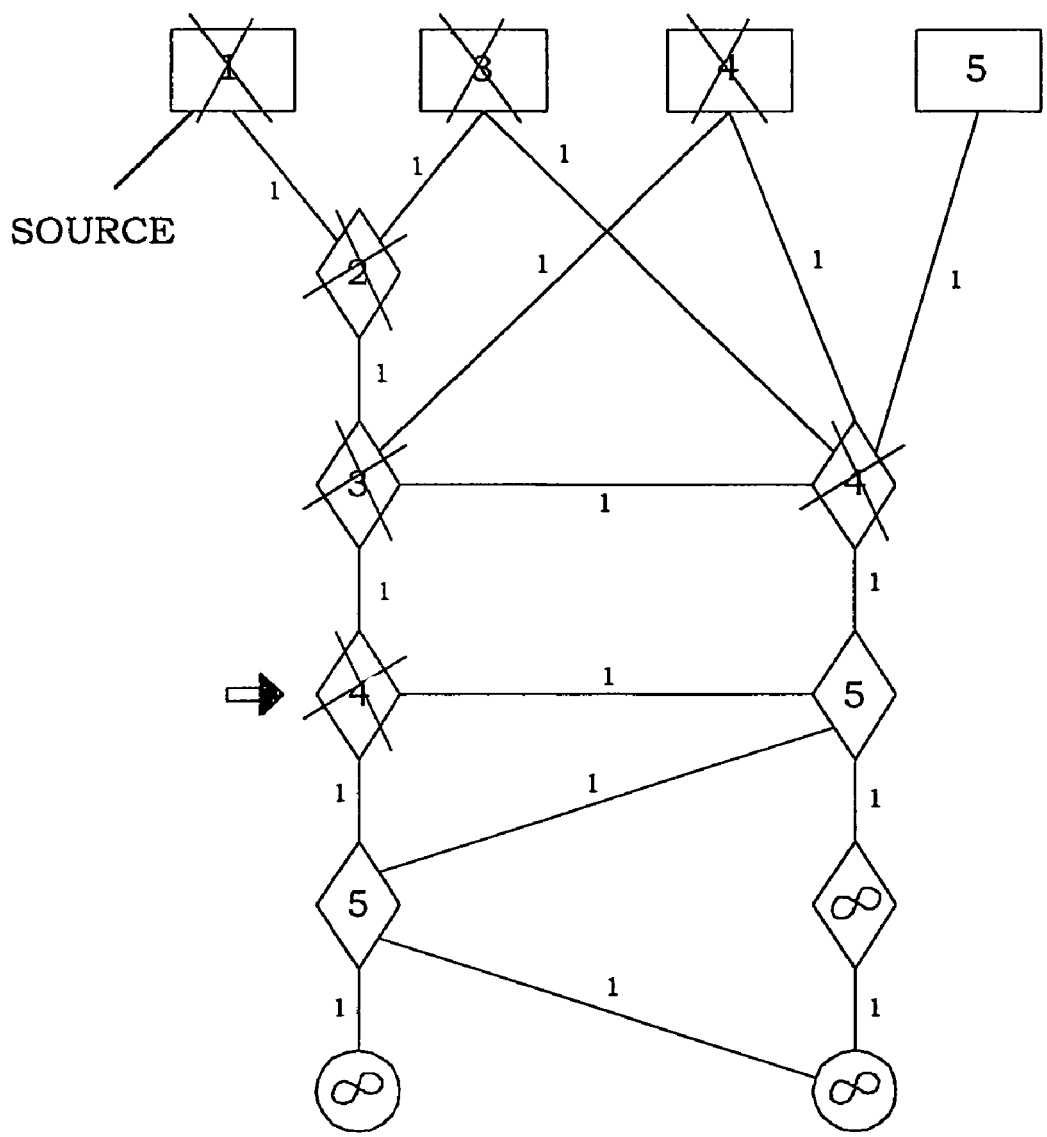
Figure 18:
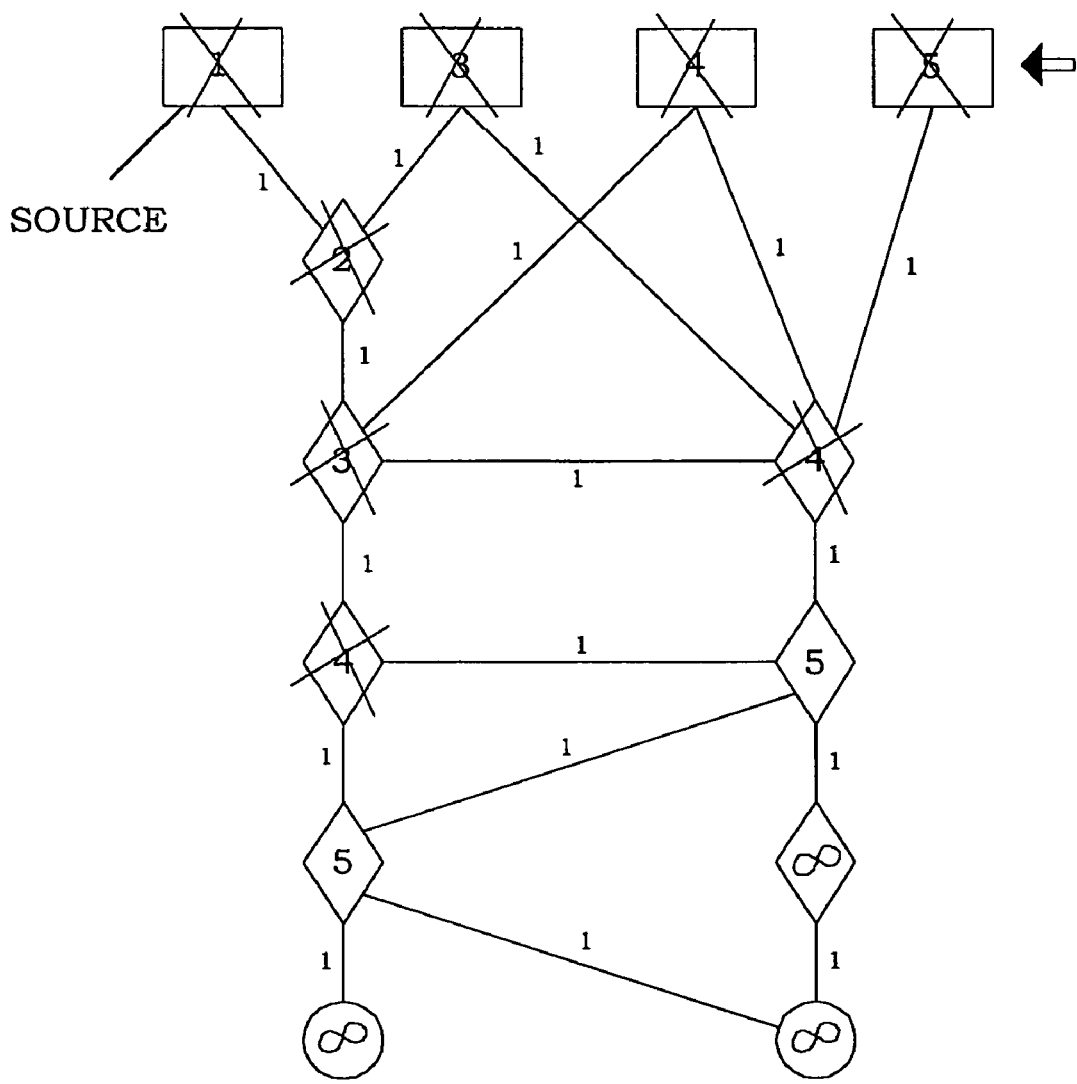
Figure 19:
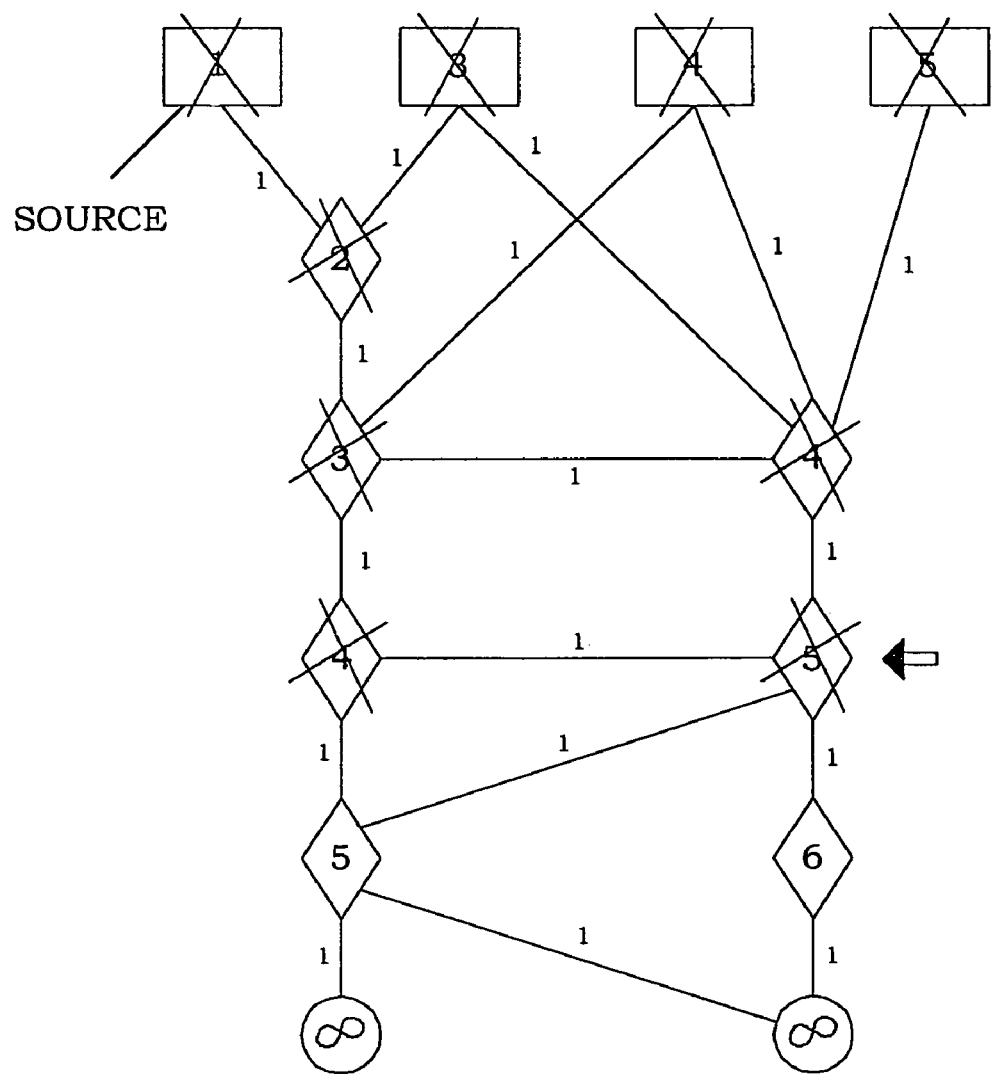
Figure 20:
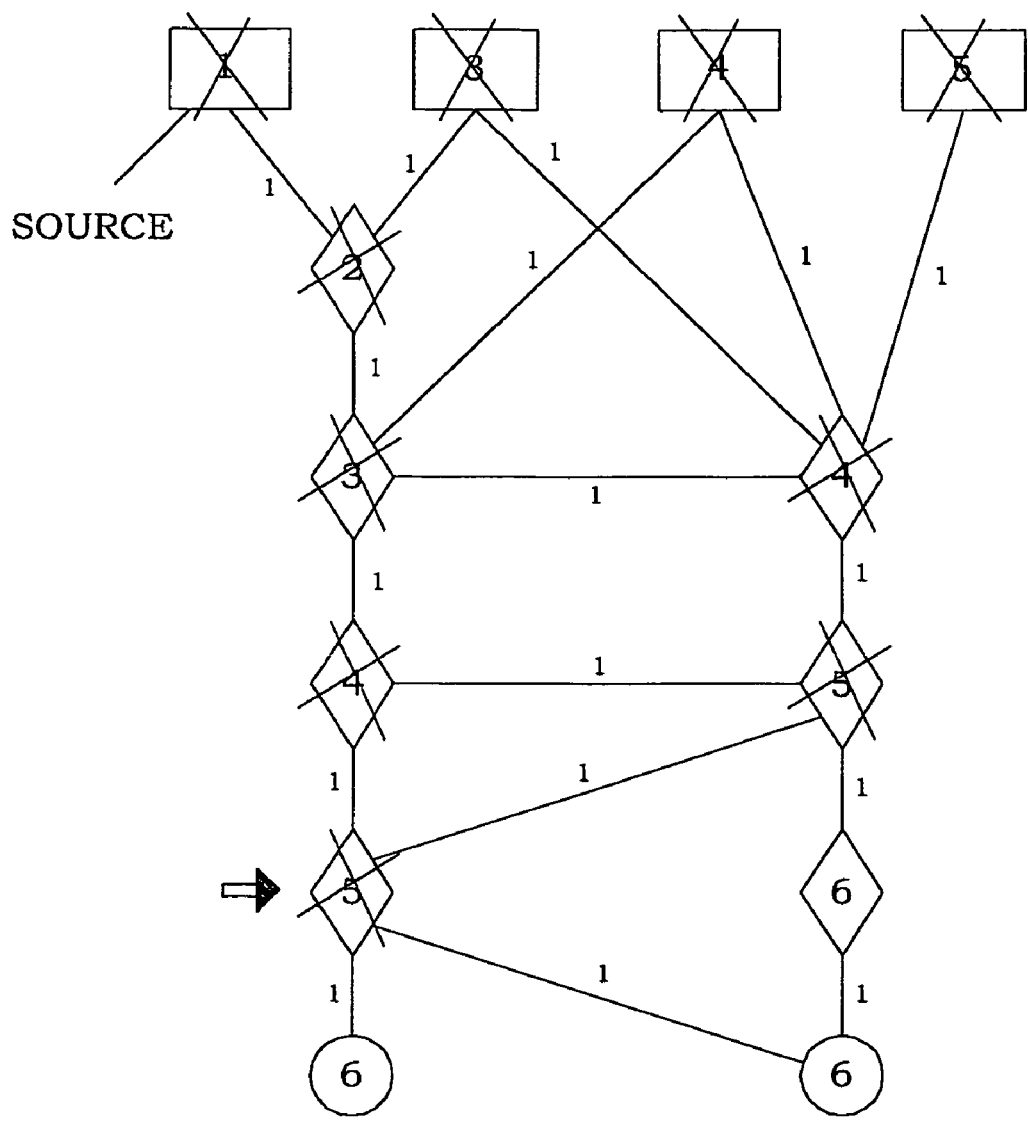
Figure 21:
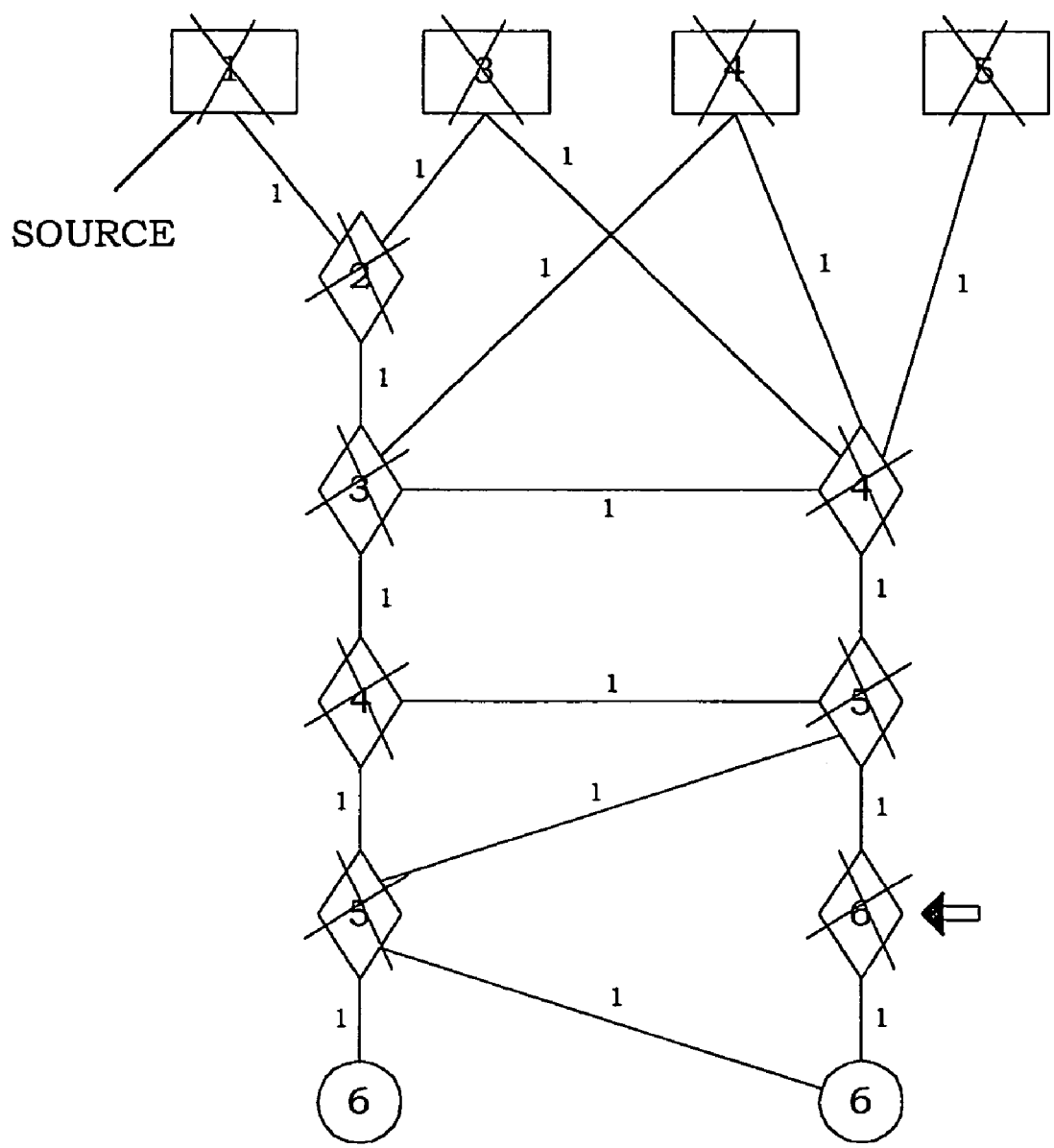
Figure 22:
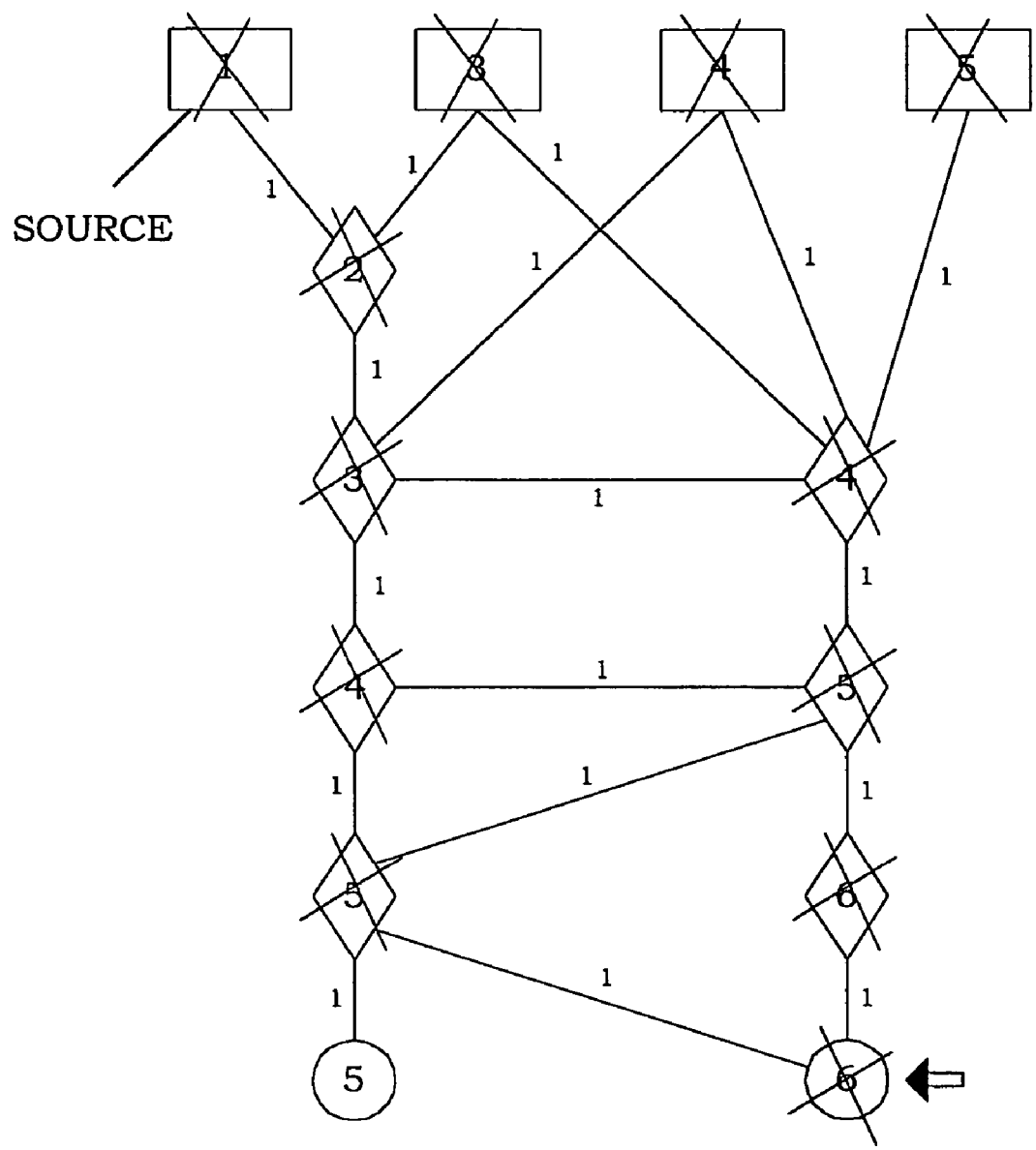

In FIG. 13, there are two components 30, 39 having minimal distance value "3", so that either of them could be expanded. In the illustration, component 30 is expanded and the neighboring component 40, which has not yet been crossed out, is assigned value "4". The original component 30 is crossed out.

In FIGS. 14 to 22, the procedure continues in the same way as described in FIGS. 10 to 13.

Figure 23:
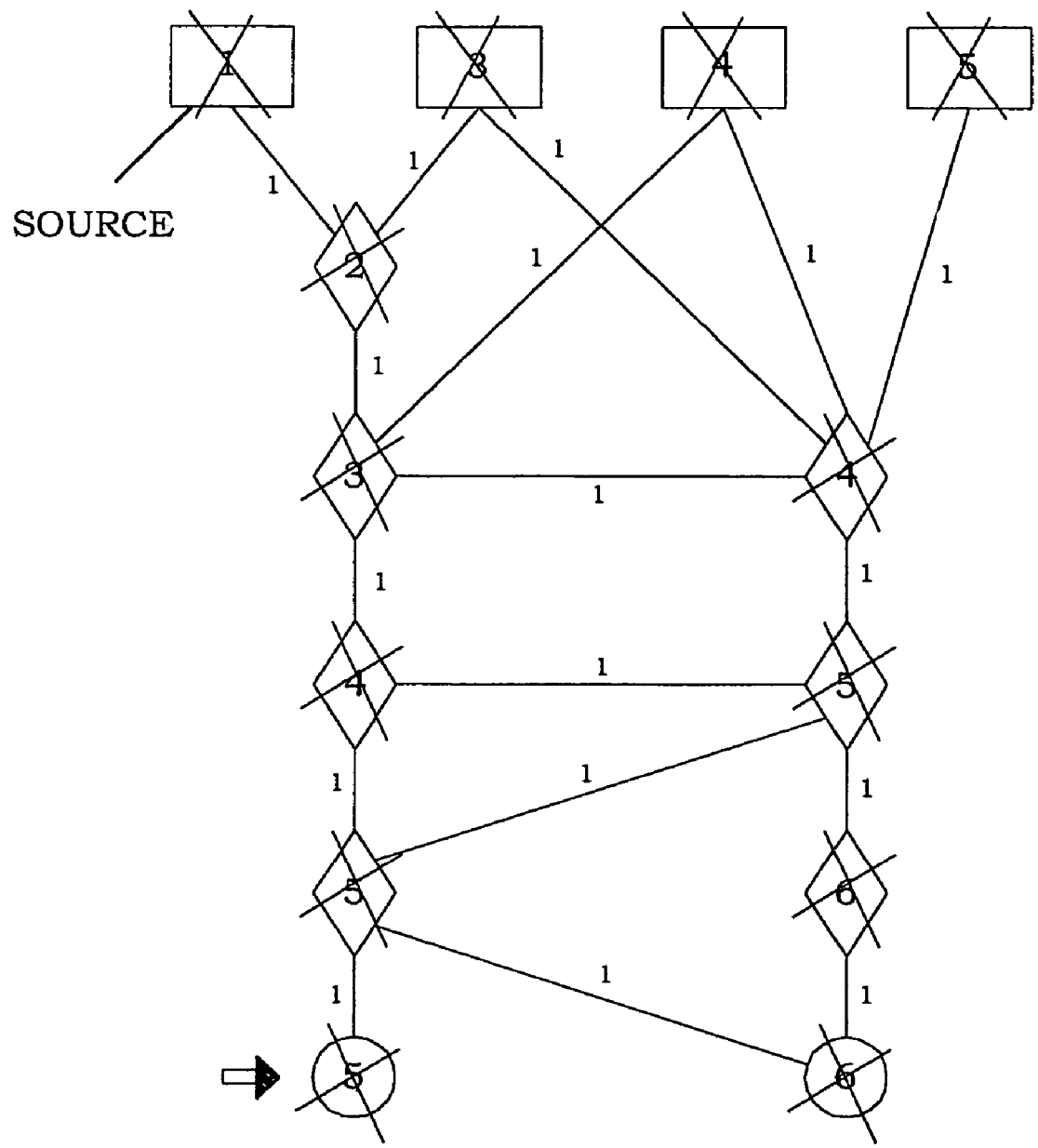

In FIG. 23, the procedure has finished since all components are crossed out. Each value now indicates the minimal distance from the corresponding component to the source component.

In order to determine the hierarchy level of each component, the procedure has to be executed for each of the host devices as the source component in its own pass. The minimal value of each component over all passes is taken as the hierarchy level for the corresponding component. The passes in which the other host devices are taken as the source components and the shortest paths from all components to the source component are not depicted here since they exactly follow the procedure described in FIGS. 10 to 23.

FIGS. 24 to 37 refer to another exemplary embodiment of calculating shortest paths, as an alternative to the procedure presented in FIG. 10 to 23. The alternative procedure is based on calculating the shortest paths according to a breadth-first procedure (see, for example, Cormen, T. H., Leiserson C. E., Rivest, R. L.: "Introduction to Algorithms", pp. 469-475).

Figure 24:
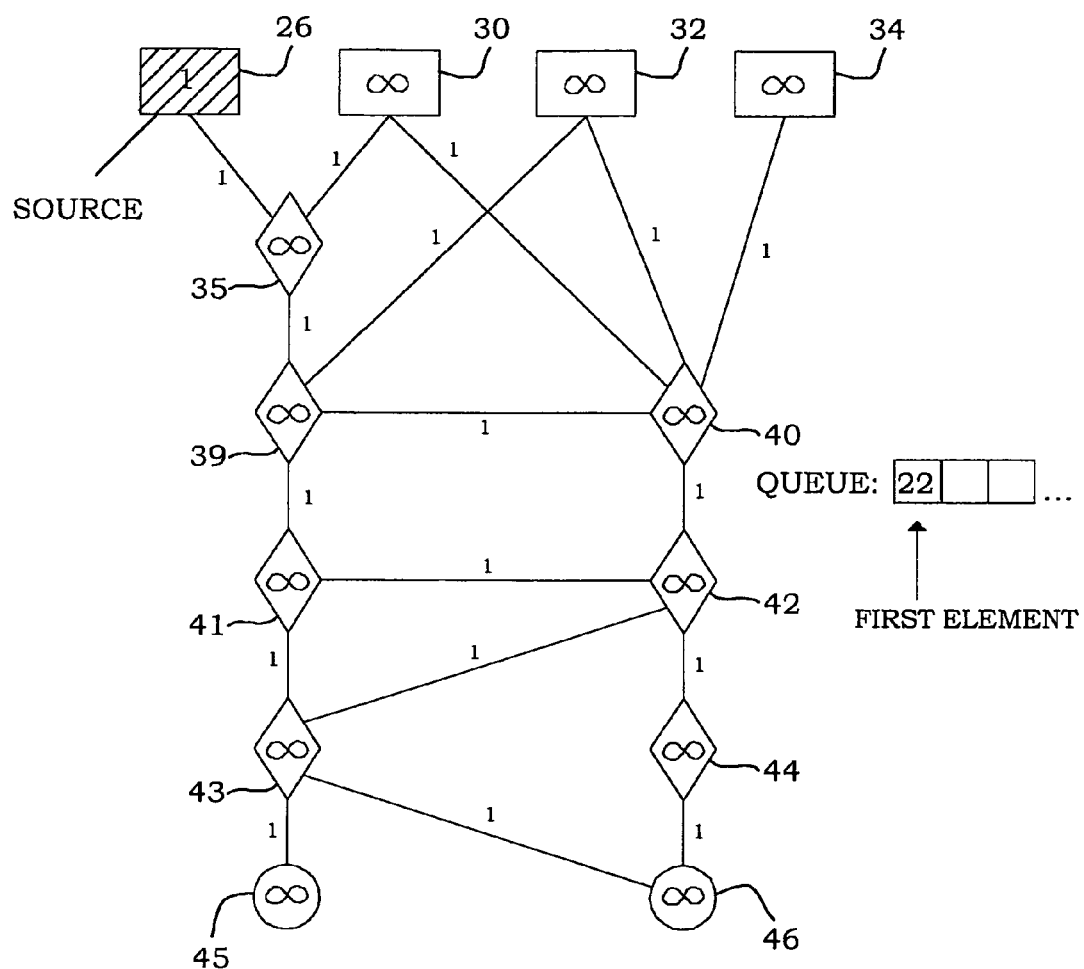
FIGS. 24 to 37 illustrate the calculation of shortest paths according to a breadth-first procedure with the first host device as the source component.

FIG. 24 shows an initial state of a breadth-first procedure. The source component is assigned value "1" and all other components are assigned "infinity". The links between the components are assigned value "1". Beside the SAN, a queue is considered which works according to a FIFO-semantic (FIFO means first-in-first-out). Elements are enqueued at the right-hand end of the queue and a dequeue-operation takes out the first element at the left-hand end of the queue. Elements currently in the queue are represented as hatched rectangles in the illustration of the SAN. In this depiction, the source component 26 is enqueued in the initially empty queue and is illustrated as a hatched rectangle in the depiction of the SAN.

Figure 25:
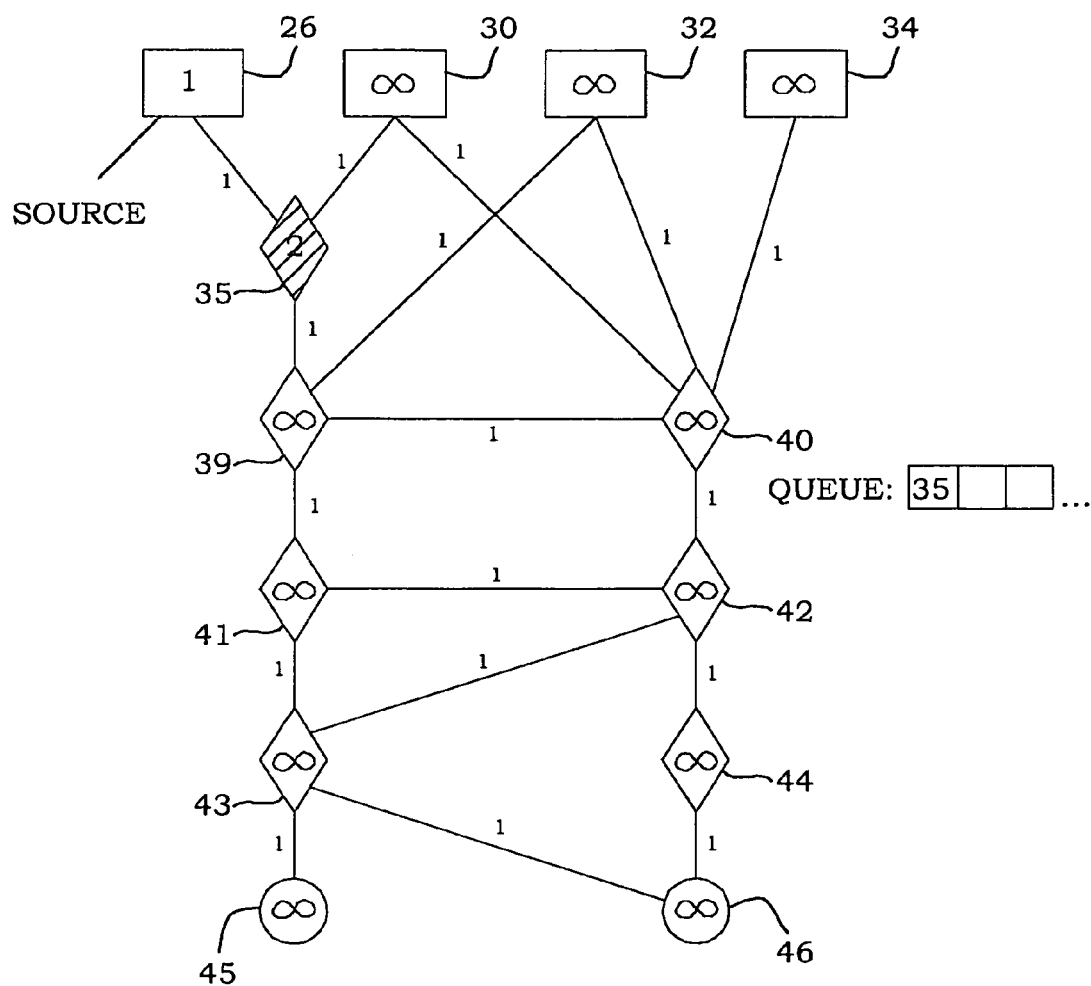

In FIG. 25, a dequeue-operation is performed indicating that the first element (i.e. the leftmost element) in the queue is now processed, i.e. the element 26 is removed from the queue and the assigned distance value is depicted in a circle. All neighboring elements which have not yet been processed, in this case element 35, are enqueued at the right-hand end of the queue and are depicted as hatched rectangles.

Figure 26:
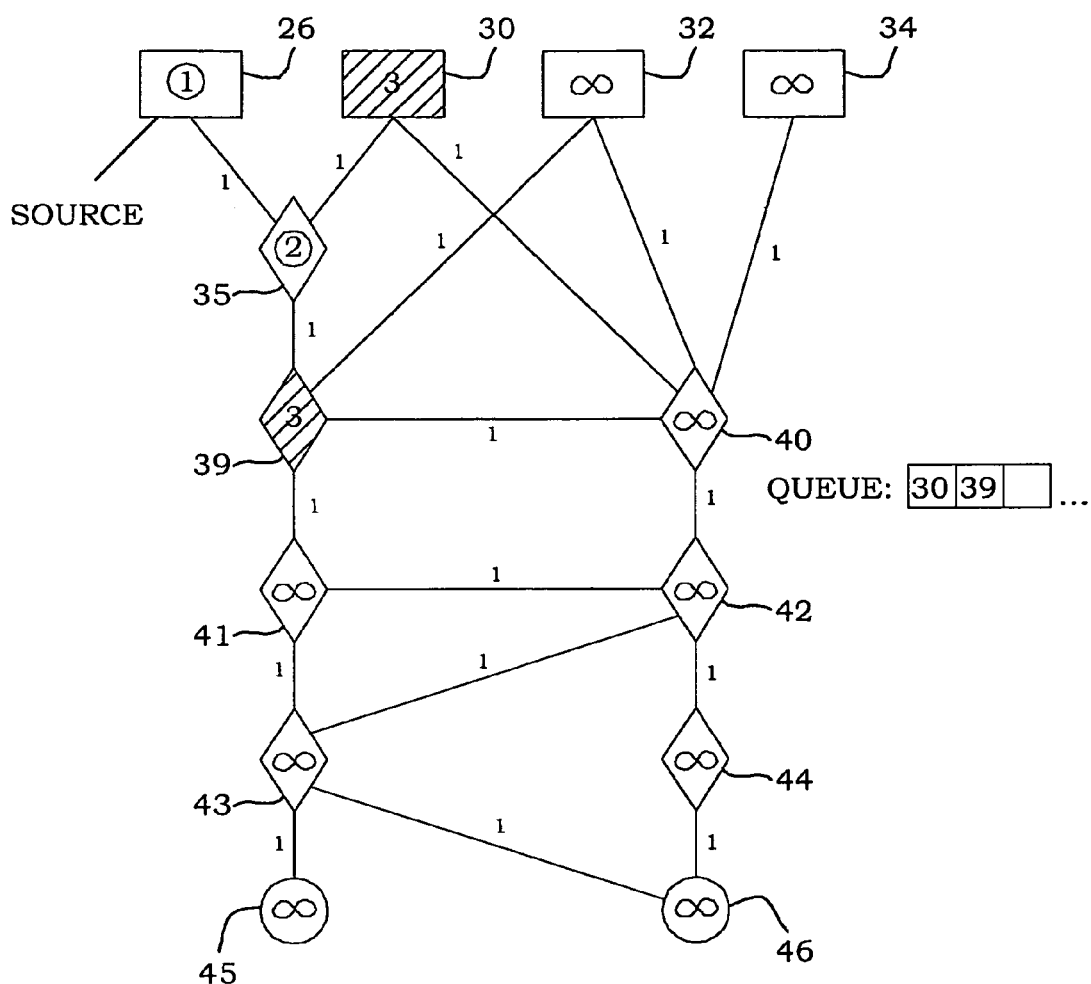
Figure 27:
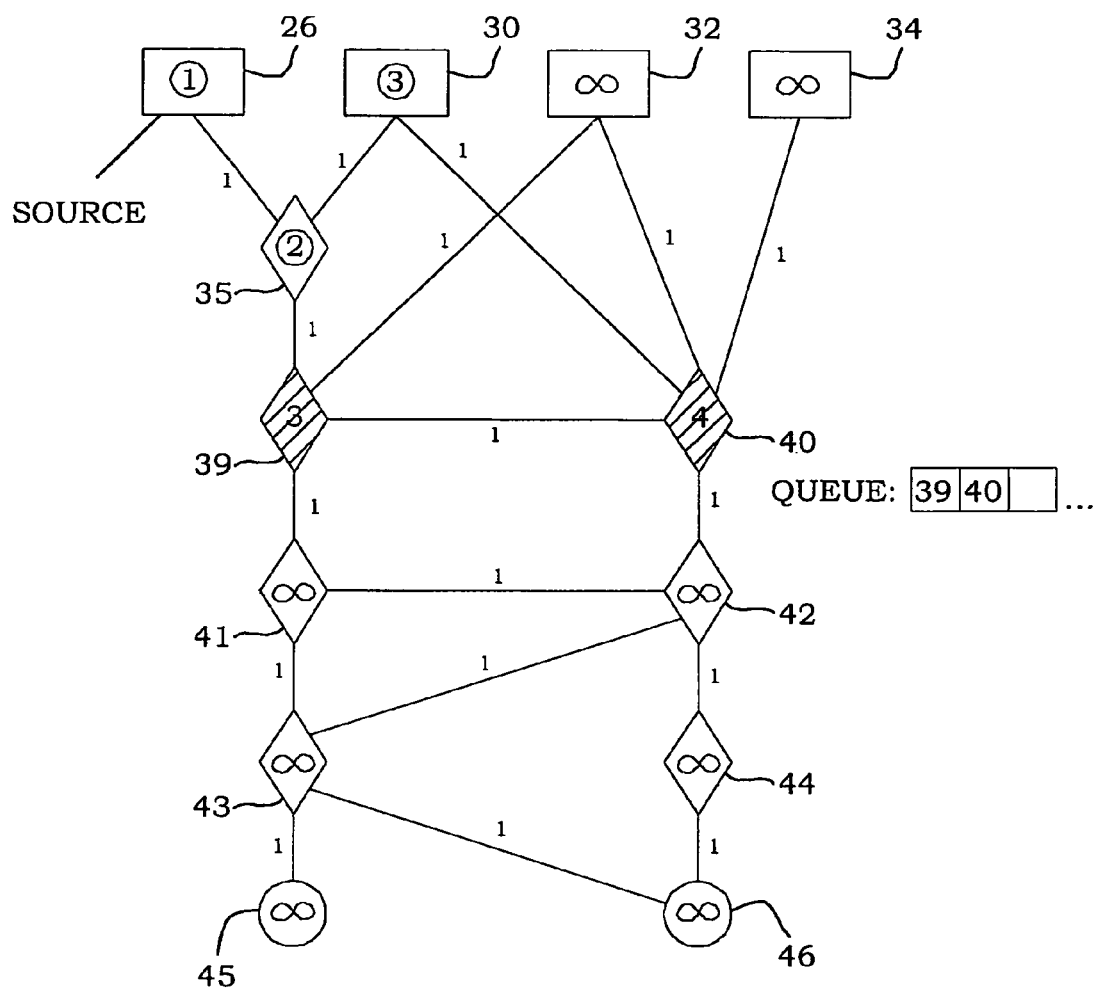
Figure 28:
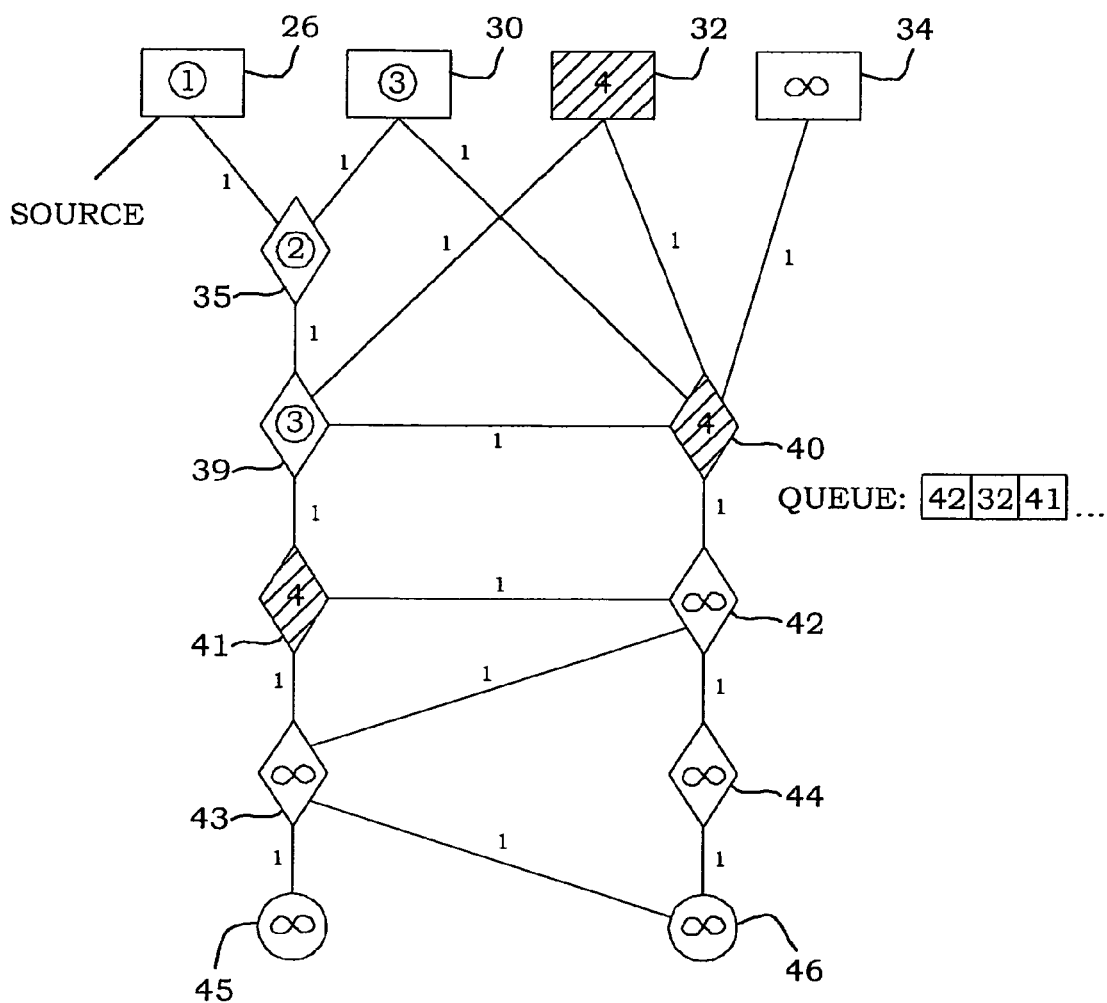
Figure 29:
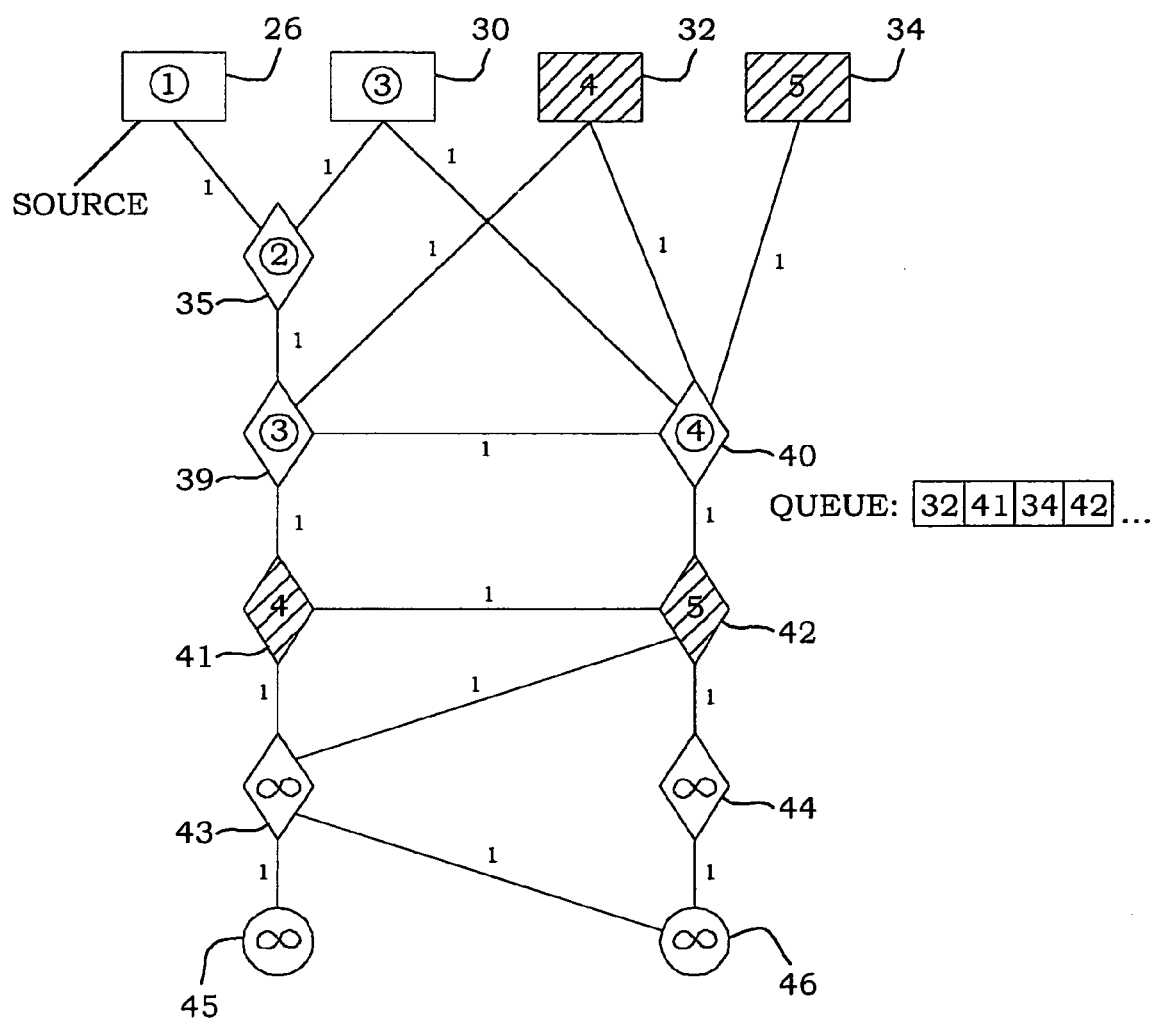
Figure 30:
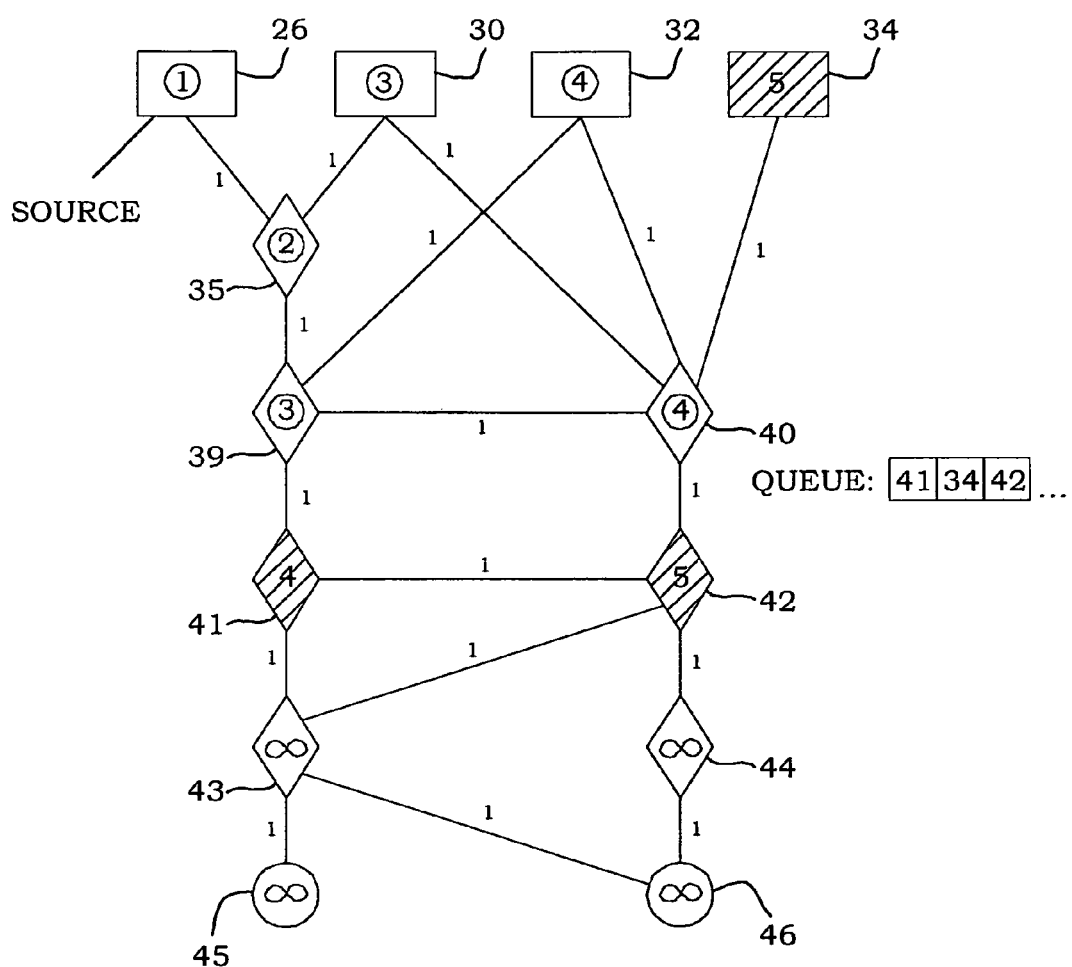
Figure 31:
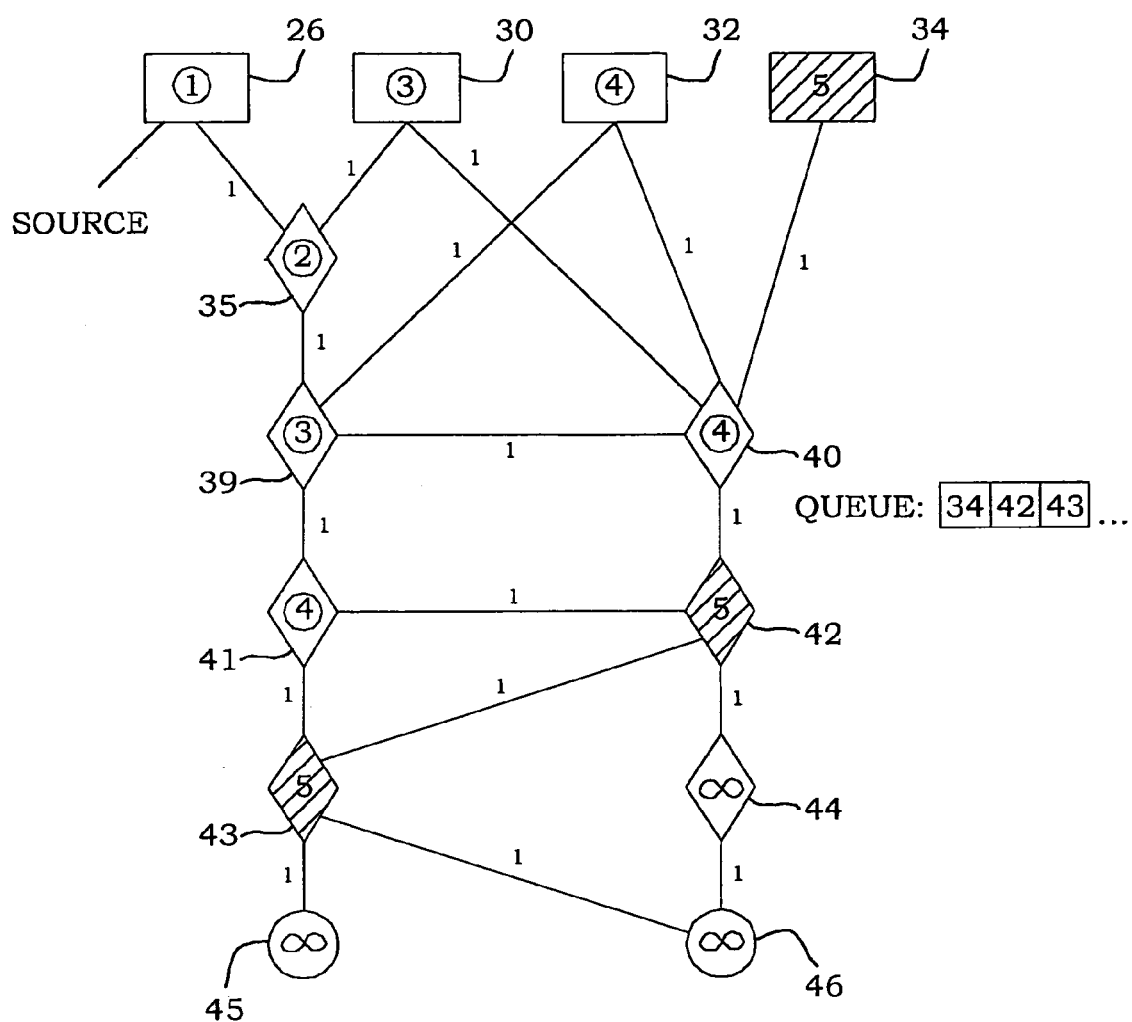
Figure 32:
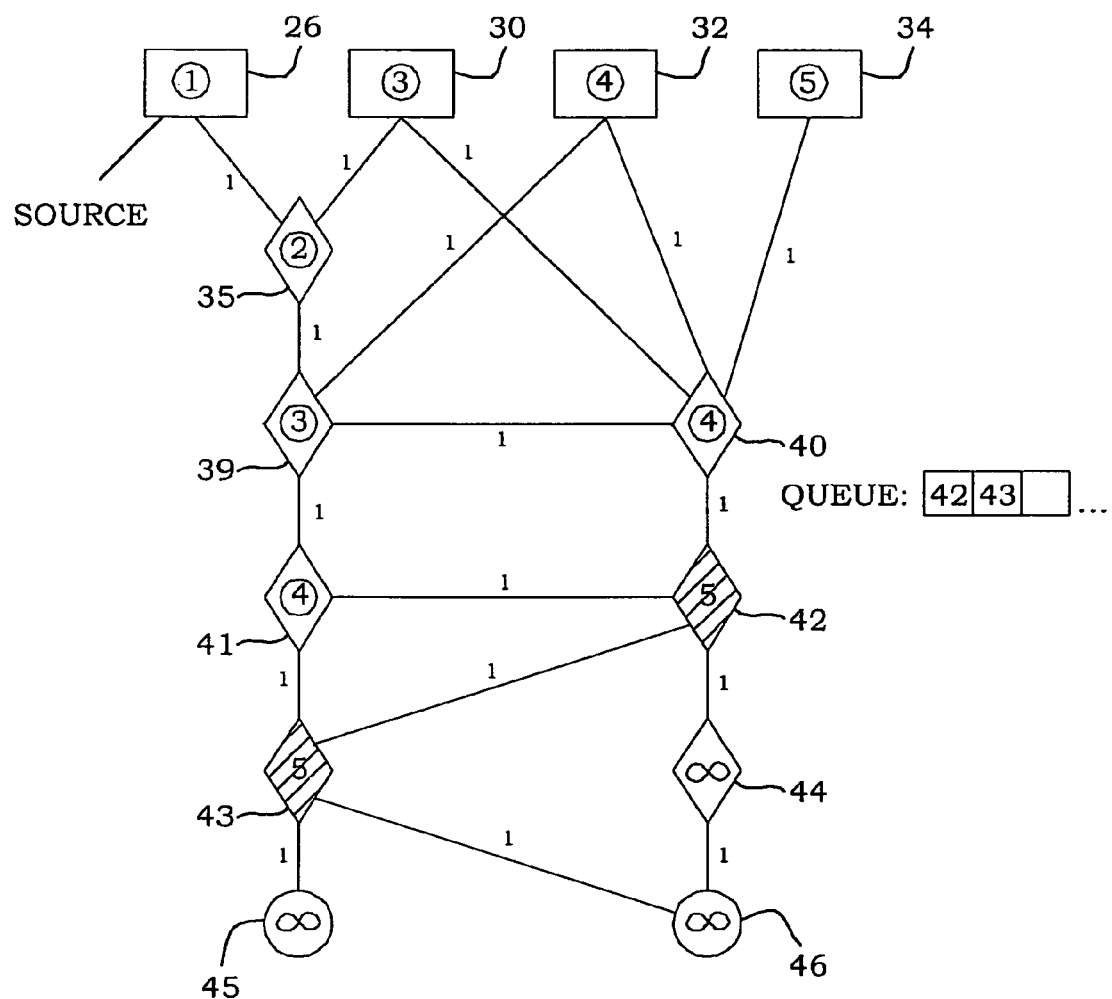
Figure 33:
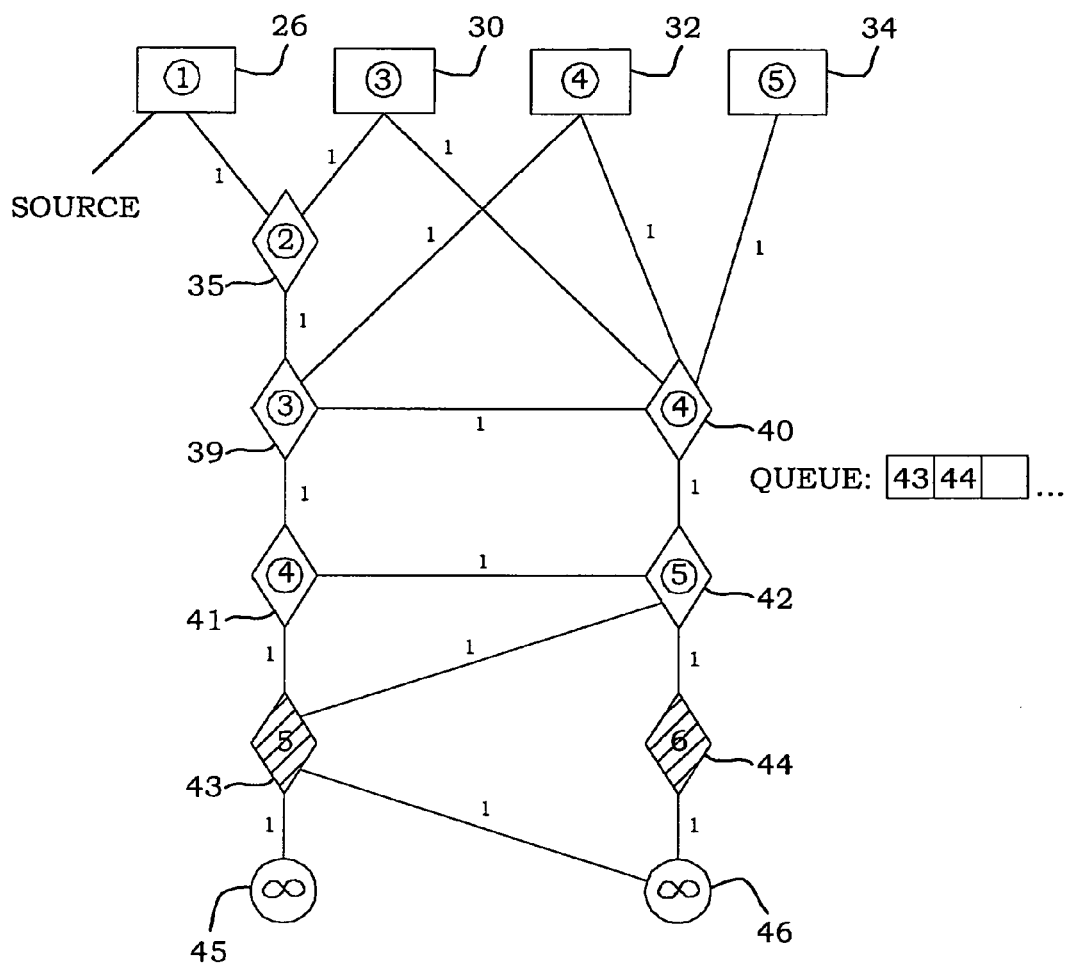
Figure 34:
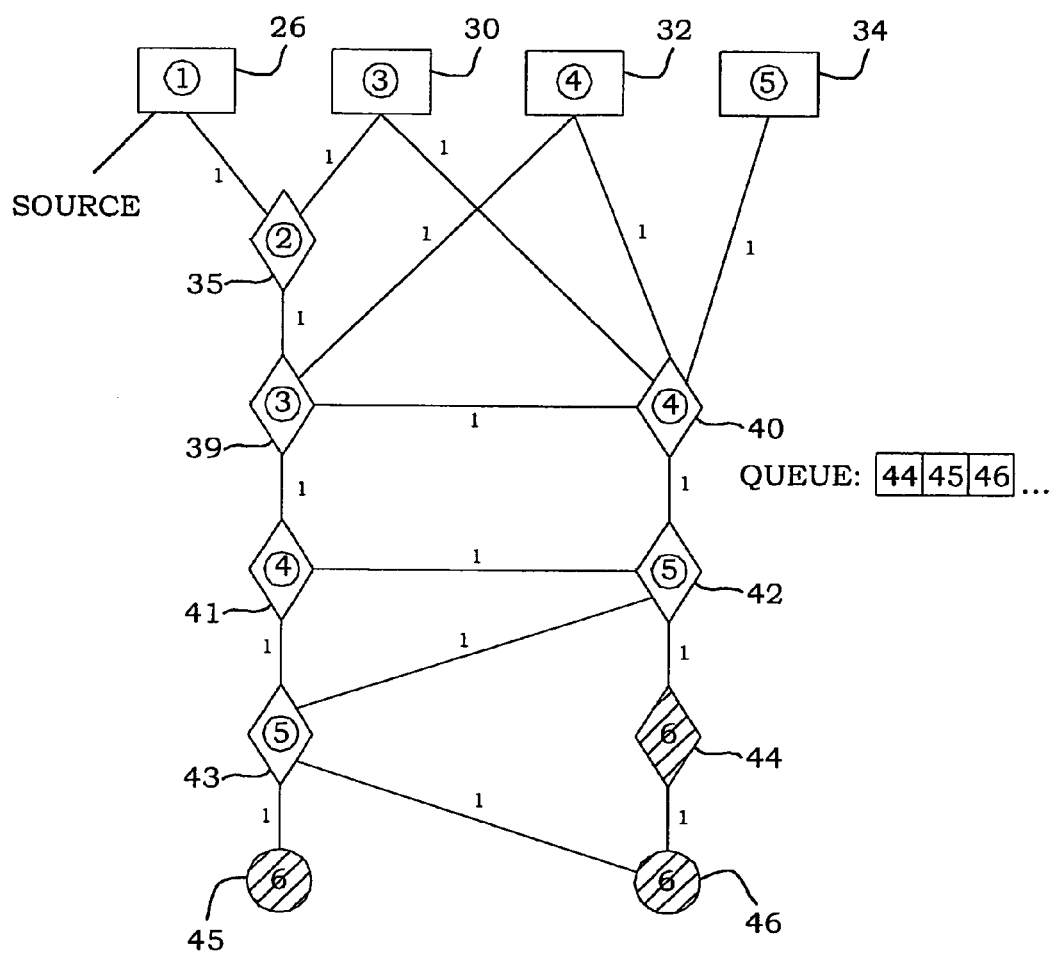
Figure 35:
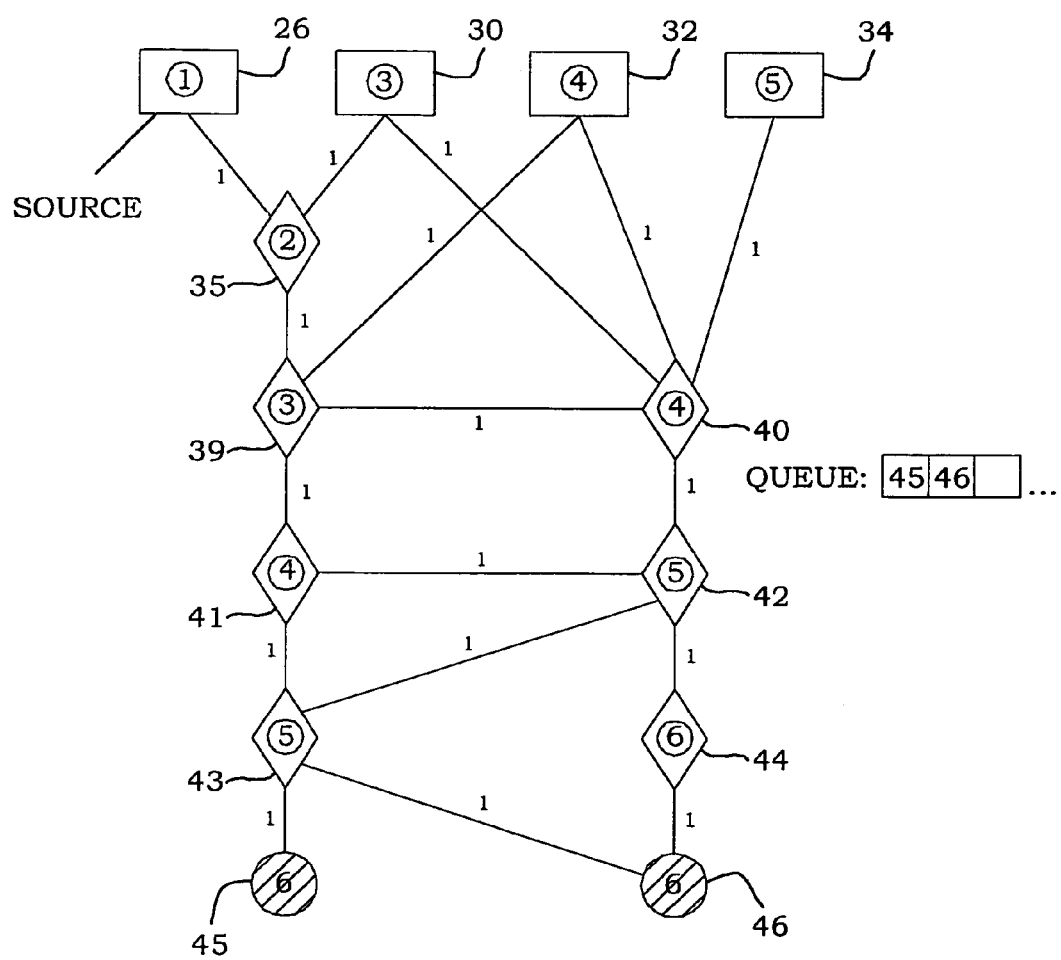

In FIG. 26, a dequeue-operation is performed indicating that the first element in the queue is now processed, i.e. the element 35 is removed from the queue and the assigned distance value is depicted in a circle. All neighboring elements which have not yet been processed, in this case elements 30 and 39, are enqueued at the right-hand end of the queue and are depicted as hatched rectangles.

In FIGS. 27 to 35, the procedure continues in the same way as described in FIG. 25 and FIG. 26.

Figure 36:
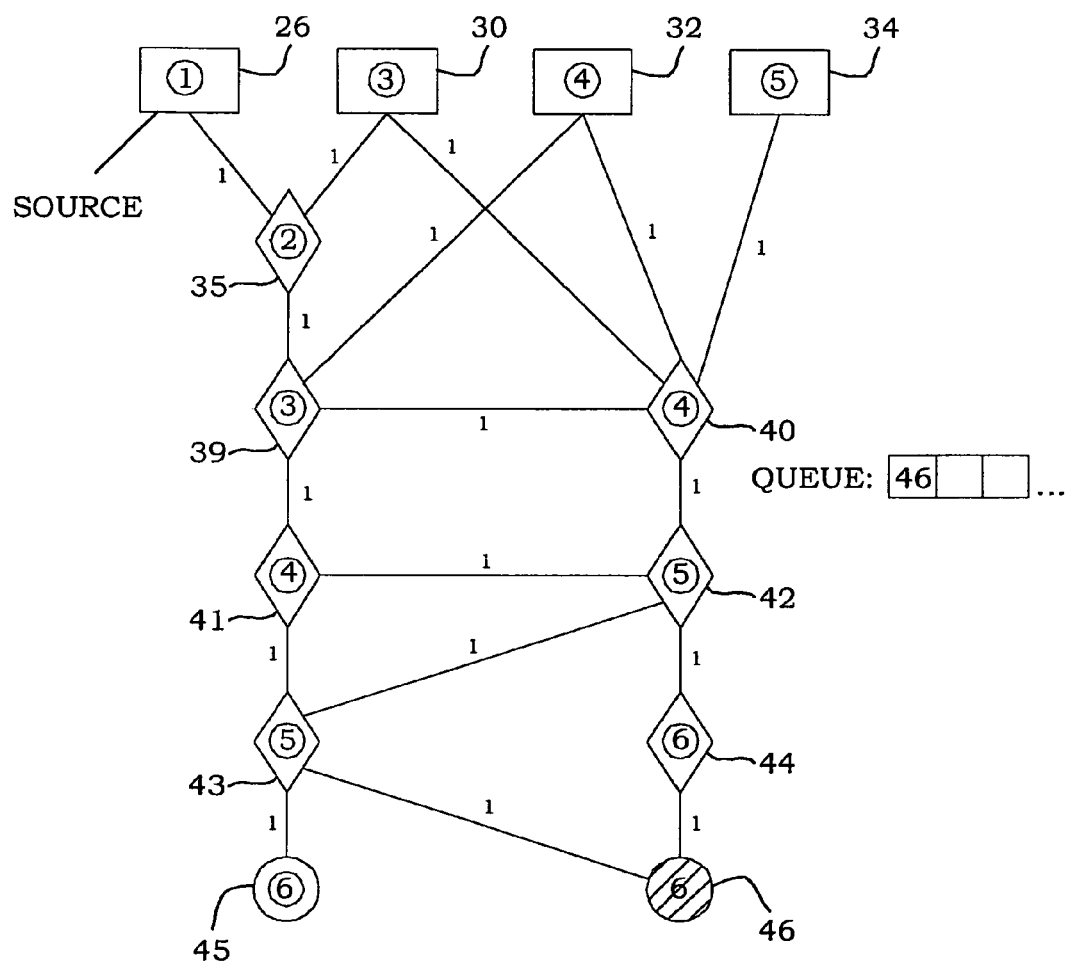

In FIG. 36, a dequeue-operation is performed indicating that the first element in the queue is now processed, i.e. the element 46 is removed from the queue and the assigned distance value is depicted in a circle. All neighboring elements which have not yet been processed, in this case no elements, are enqueued at the right-hand end of the queue and are depicted as hatched rectangles.

Figure 37:
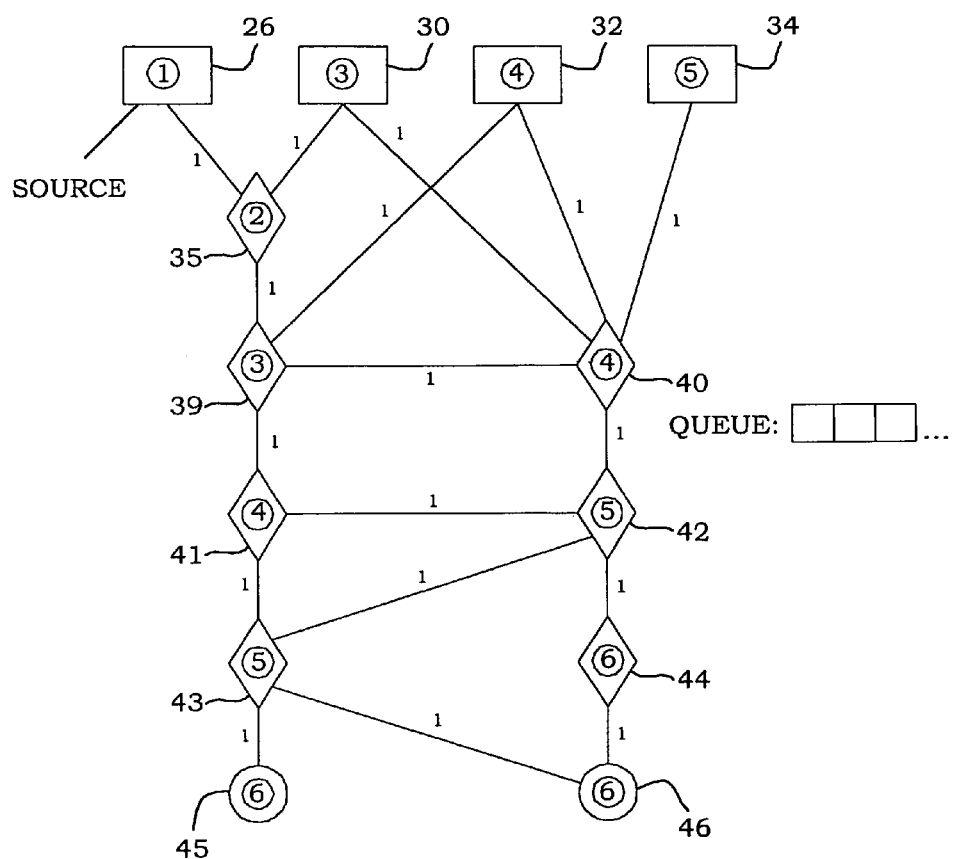

FIG. 37 shows the final state of the procedure, all elements have been processed and the queue is empty. The distance value assigned to each network component now indicates the minimal distance to the source component.

Figure 38:
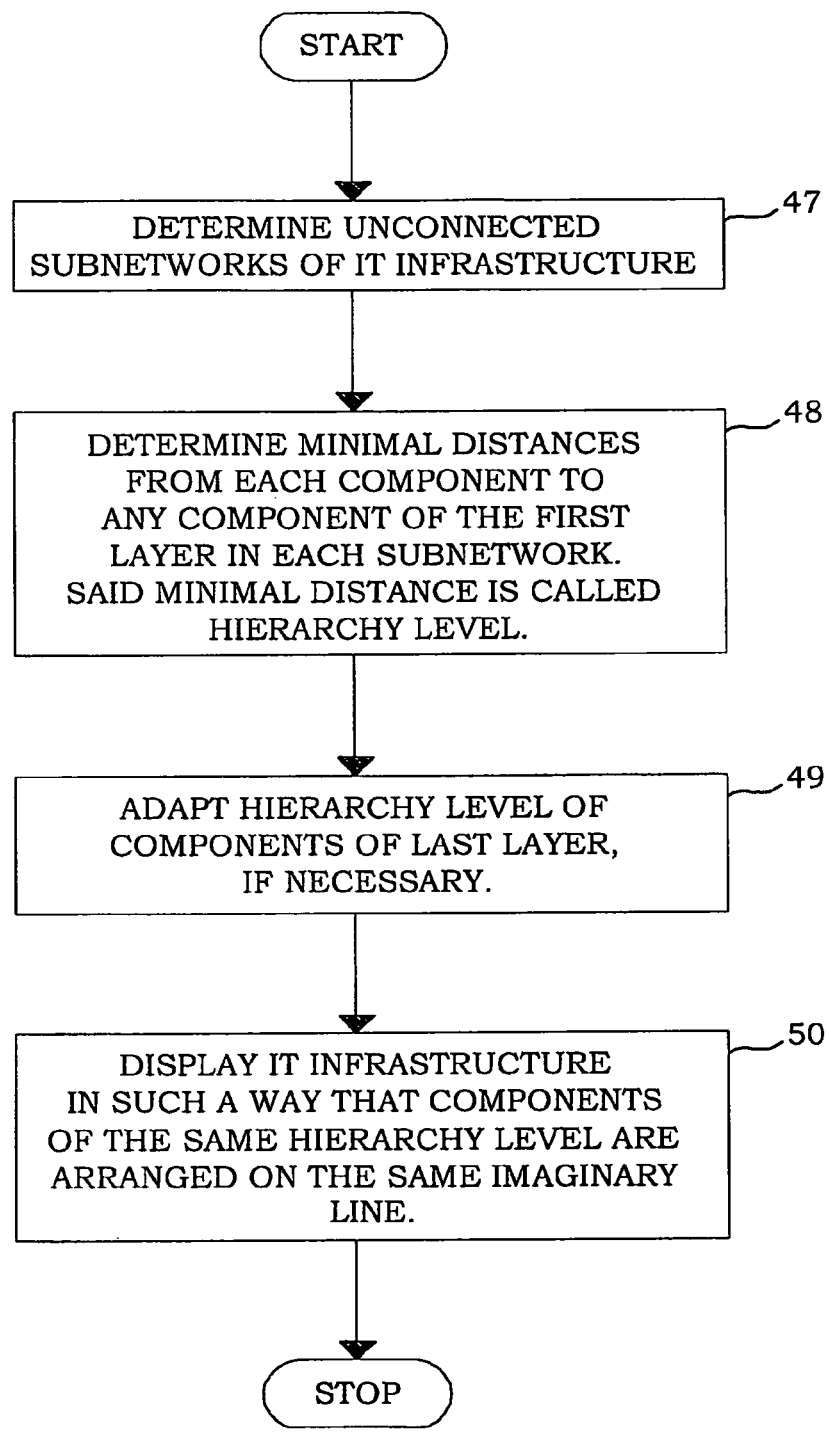
FIG. 38 shows a flowchart giving a survey of the entire arrangement procedure, according to embodiments of the invention.

FIG. 38 shows a flowchart giving a survey of the whole displaying procedure. At 47, the unconnected sub-networks of an IT network are computed. At 48, the minimal distance from each component to any component of the first layer in each sub-networks is determined. The minimal distance is called hierarchy level. The shortest paths are calculated using a single-source-shortest-path procedure proposed by Dijkstra or a breadth-first procedure. At 49, the hierarchy levels of the last layer are adapted if the components of the last layer have been assigned different hierarchy levels by the single-source-shortest-paths procedure or by the breadth-first procedure. All components are assigned the maximum hierarchy level of all previously assigned values in such a way that all components of the component type with the lowest priority form exactly one layer. At 50, the IT network is displayed in a graphical user interface in such a way that components of the same hierarchy level are graphically arranged on the same imaginary line.

FIG. 39 gives a survey of the hierarchy level assignment procedure as described above.

Figure 40:
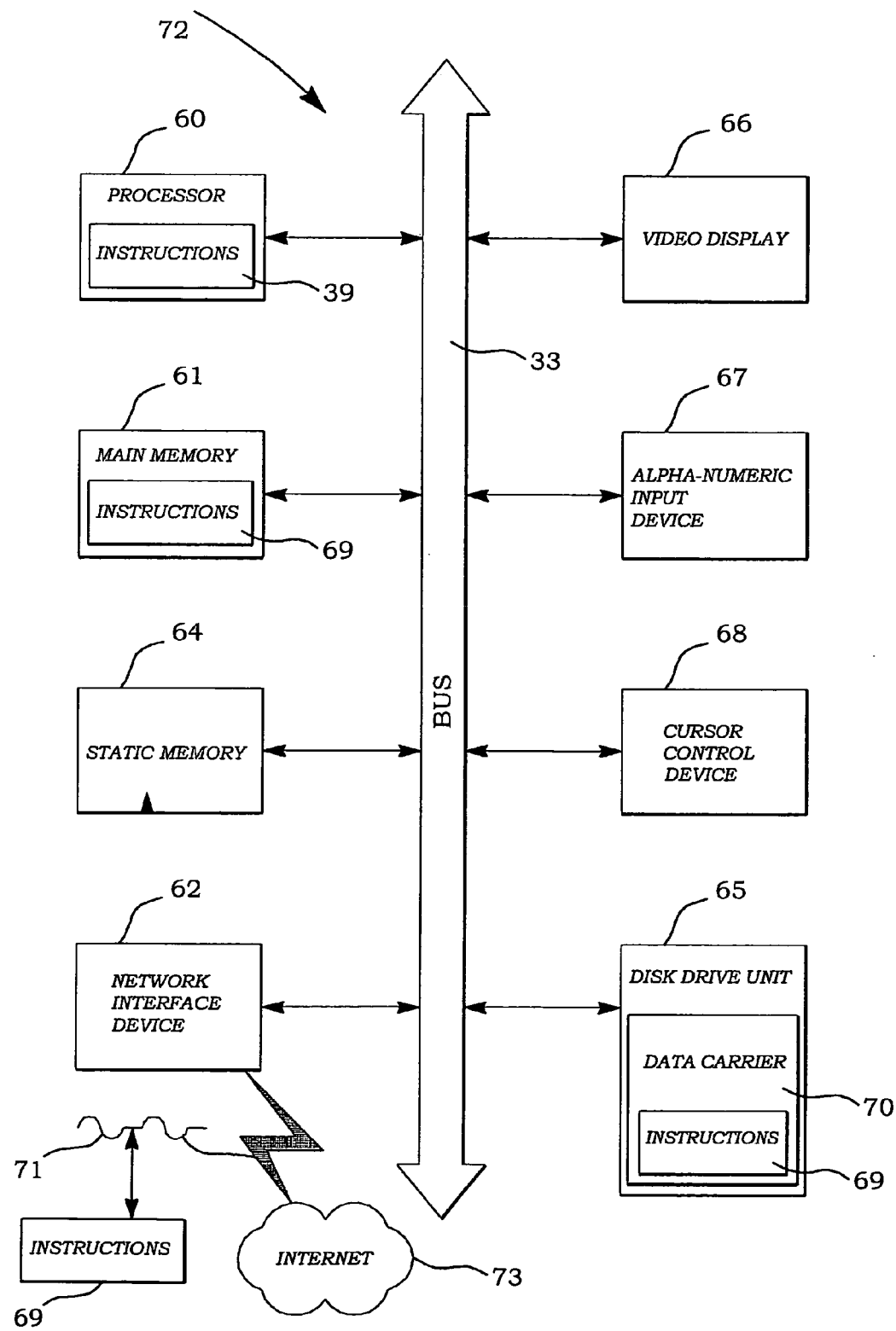
FIG. 40 is a diagrammatic representation of an exemplary embodiment of a computer system for computing an arrangement of network components, according to embodiments of the invention.

FIG. 40 is a diagrammatic representation of a computer system which provides the functionality of graphically arranging network components according to the embodiments of the invention, and is therefore denoted as "arrangement computer system 72". Within the arrangement computer system 72, a set of instructions, to cause the computer system to perform any of the methodologies discussed herein, may be executed. The arrangement computer system 72 includes a processor 60, a main memory 61 and a network interface device 62, which communicate with each other via a bus 63. Optionally, it may further include a static memory 64 and a disk drive unit 65. A video display 66, an alpha-numeric input device 67 and a cursor control device 68 may form a user interface. The arrangement of network components is displayed on the video display 66. The network interface device 62 connects the computer system 1 to the Internet 73. A set of instructions (i.e. software) 69 embodying any one, or all, of the methodologies described above, resides completely, or at least partially, in or on a machine-readable medium, e.g. the main memory 61 and/or the processor 60. A machine-readable medium on which the software 69 resides may also be a data carrier 70 (e.g. a non-removable magnetic hard disk or an optical or magnetic removable disk) which is part of disk-drive unit 65. The software 69 may further be transmitted or received as a propagated signal 71 via the Internet through the network interface device 62.

Thus, the embodiments of the invention described above enable a graphical arrangement of network components for visualization purposes by assigning hierarchy levels to the network components.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method executed by a computer of graphically arranging components of an IT network into a layered representation for visualization purposes, the IT network comprising network components of different types, and links connecting the network components, wherein the network components of different types include a plurality of servers, storage devices, and interconnecting devices for connecting the servers to the storage devices, the method comprising:

regarding each of the servers as a source component;

executing a plurality of passes of a procedure, one pass for each of the servers being the source component, wherein the execution of the plurality of passes produces a plurality of assigned values for each component in the IT network, and wherein executing each of the plurality of passes includes assigning a value to the source component, and assigning a value to each component, other than the source component, in the IT network based on a distance measure that represents a minimal number of links for traversing from the respective component to the source component;

assigning a hierarchy level for each component by selecting a minimal value from the plurality of assigned values of each component; and displaying the network components in a layered representation according to the hierarchy level assigned to each component, wherein, before the assigning and displaying, determining whether the IT network is completely unconnected or has unconnected sub-networks, and in response to a determination of unconnected sub-networks, applying the assigning of a hierarchy level to each component and displaying the network components to the unconnected sub-networks.

2. The method of claim 1, wherein the component types are prioritized depending on the respective component type such that the components of a certain component type are assigned a higher priority than the components of another component type, and the components of the type with the highest prioritization are regarded as the source components and make up a first layer, the components of the type with the lowest prioritization make up a last layer and the components of all other types form an intermediate layer, and
wherein the servers form the first layer, the storage devices form the last layer, and the interconnecting devices form the intermediate layer.

3. The method of claim 2, wherein the intermediate layer is further divided into sub-layers.

4. The method of claim 2, wherein numerical values, called link weights, are assigned to the links between the components, and a path between two components is assigned a sum of link weights belonging to the path, called path weight, and the minimal distance between two components is the minimal path weight over all paths between the two components.

5. The method of claim 4, wherein the minimal distance is determined by calculating shortest paths in the IT network.

6. The method of claim 5, wherein the calculation of shortest paths is done substantially using Dijkstra's single-source-shortest-paths procedure, which is executed for each component of the first layer.

7. The method of claim 6, wherein the hierarchy levels of the network components of the last layer, assigned by Dijkstra's procedure are adapted, in response to the components of the last layer having been assigned different hierarchy levels by Dijkstra's procedure, so that the components of the last layer are assigned the maximum value of all hierarchy levels of the network components of the last layer assigned by Dijkstra's procedure.

8. The method of claim 5, wherein the calculation of shortest paths is done using a breadth-first-search procedure, which is executed for each component of a first layer.

9. The method of claim 8, wherein the hierarchy levels of the network components of the last layer, assigned by the breadth-first search are adapted, in response to the components of the last layer having been assigned different hierarchy levels by the breadth-first search, so that the components of the last layer are assigned the maximum value of all hierarchy levels of the network components of the last layer assigned by the breadth-first search.

10. A computer system being programmed to graphically arrange components of an IT network into a layered representation for visualization purposes, the IT network comprising network components of different types, and links connecting the network components, wherein the network components of different types include a plurality of servers, storage devices, and interconnecting devices for connecting the servers to the storage devices, the computer system comprises a processor, the processor being configured to
regard each of the servers as a source component;
execute a plurality of passes of a procedure, one pass for each of the servers being the source component, wherein the execution of the plurality of passes produces a plurality of assigned values for each component in the IT network, and
wherein execute each of the plurality of passes includes assign a value to the source component, and assign a value to each component, other than the source component, in the IT network based on a distance measure that represents a minimal number of links for traversing from the respective component to the source component;
assign a hierarchy level to each component in the IT network by selecting a minimal value from the plurality of assigned values of each component; and
display the network components in layered representation according to the hierarchy level assigned to each component,
wherein, before the processor is to assign and display, the processor is to determine whether the IT network is completely unconnected or has unconnected sub-networks, and in response to a determination of unconnected sub-networks, apply the assigning of a hierarchy level to each component and displaying the network components to the unconnected sub-networks.

11. A computer program product in the form of a non-transitory machine-readable storage medium with program code stored on it, wherein the program code is arranged to carry out a method, when executed on a computer system, of graphically arranging components of an IT network into a layered representation for visualization purposes, the IT network comprising network components of different types, and links connecting the network components, wherein the network components of different types include a plurality of servers, storage devices, and interconnecting devices for connecting the servers to the storage devices, the method comprising:
regarding each of the servers as a source component;
executing a plurality of passes of a procedure, one pass for each of the servers being the source component, wherein the execution of the plurality of passes produces a plurality of assigned values for each component in the IT network, and
wherein executing each of the plurality of passes includes assigning a value to the source component, and assigning a value to each component, other than the source component, in the IT network based on a distance measure that represents a minimal number of links for traversing from the respective component to the source component;
assigning a hierarchy level for each component by selecting a minimal value from the plurality of assigned values of each component; and
displaying the network components in layered representation according to the hierarchy level assigned to each component,
wherein, before the assigning and displaying, determining whether the IT network is completely unconnected or has unconnected sub-networks, and in response to a determination of unconnected sub-networks, applying the assigning of a hierarchy level to each component and displaying the network components to the unconnected sub-networks.

* * * * *

UNITED STATES PATENT AND TRADEMARK OFFICE
CERTIFICATE OF CORRECTION

| | | |
|---|---|---|
| PATENT NO. | : 8,199,678 B2 | Page 1 of 1 |
| APPLICATION NO. | : 11/492197 | |
| DATED | : June 12, 2012 | |
| INVENTOR(S) | : Pascal Molix et al. | |

It is certified that error appears in the above-identified patent and that said Letters Patent is hereby corrected as shown below:

In column 13, line 47, in Claim 10, after "to" insert -- : --.

Signed and Sealed this
Fifteenth Day of January, 2013

David J. Kappos
*Director of the United States Patent and Trademark Office*